(12) United States Patent
Kobayashi et al.

(10) Patent No.: US 11,722,771 B2
(45) Date of Patent: Aug. 8, 2023

(54) INFORMATION PROCESSING APPARATUS, IMAGING APPARATUS, AND INFORMATION PROCESSING METHOD EACH OF WHICH ISSUES A NOTIFICATION OF BLUR OF AN OBJECT, AND CONTROL METHOD FOR THE IMAGING APPARATUS

(71) Applicant: CANON KABUSHIKI KAISHA, Tokyo (JP)

(72) Inventors: Satoru Kobayashi, Tokyo (JP); Nozomu Saito, Fuchu (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/719,550

(22) Filed: Dec. 18, 2019

(65) Prior Publication Data
US 2020/0213482 A1    Jul. 2, 2020

(30) Foreign Application Priority Data

Dec. 28, 2018  (JP) .................................. 2018-247850
Nov. 27, 2019  (JP) .................................. 2019-214499

(51) Int. Cl.
*H04N 23/68*  (2023.01)
*H04N 5/14*  (2006.01)
(Continued)

(52) U.S. Cl.
CPC ........... *H04N 23/683* (2023.01); *G03B 13/18* (2013.01); *G03B 13/24* (2013.01); *G03B 17/18* (2013.01);
(Continued)

(58) Field of Classification Search
CPC .......... H04N 5/23264; H04N 5/23267; H04N 5/23277; H04N 5/144; H04N 5/145
See application file for complete search history.

(56) References Cited

U.S. PATENT DOCUMENTS 5,291,300 A * 3/1994 Ueda ...................... H04N 5/145
386/327
2003/0193610 A1* 10/2003 Nozaki ............... H04N 5/23258
348/345
(Continued)

FOREIGN PATENT DOCUMENTS

CN    101060591 A    10/2007
CN    101516001 A    8/2009
(Continued)

*Primary Examiner* — David N Werner
(74) *Attorney, Agent, or Firm* — Canon U.S.A., Inc. IP Division

(57) ABSTRACT

An apparatus includes an acquisition unit configured to acquire a first captured image obtained by first image capturing with a first image capturing parameter and motion information about an object in the first captured image, a setting unit configured to set a second image capturing parameter, an estimation unit configured to estimate motion blur of an object in a second captured image which is obtained in a case where second image capturing is performed with the second image capturing parameter, based on the motion information and the second image capturing parameter, and a notification unit configured to issue a notification of the motion blur.

24 Claims, 19 Drawing Sheets

(51) Int. Cl.
  *H04N 23/63* (2023.01)
  *H04N 23/67* (2023.01)
  *G03B 13/18* (2021.01)
  *G03B 13/24* (2021.01)
  *G03B 17/18* (2021.01)
  *H04N 19/513* (2014.01)

(52) U.S. Cl.
  CPC ........... *H04N 5/145* (2013.01); *H04N 23/634* (2023.01); *H04N 23/67* (2023.01); *H04N 23/681* (2023.01); *H04N 23/682* (2023.01); *H04N 23/689* (2023.01); *H04N 23/6811* (2023.01); *H04N 19/513* (2014.11)

(56) References Cited

U.S. PATENT DOCUMENTS

| | | | | |
|---|---|---|---|---|
| 2004/0001705 | A1* | 1/2004 | Soupliotis | G06T 5/003 386/242 |
| 2006/0098890 | A1* | 5/2006 | Steinberg | H04N 5/23258 382/255 |
| 2006/0098891 | A1* | 5/2006 | Steinberg | H04N 5/23254 382/255 |
| 2006/0140599 | A1* | 6/2006 | Nomura | H04N 5/23248 396/52 |
| 2007/0098237 | A1* | 5/2007 | Yoo | A61C 9/0053 382/128 |
| 2007/0230931 | A1 | 10/2007 | Nomura | |
| 2008/0151066 | A1* | 6/2008 | Serikawa | H04N 5/23287 348/208.6 |
| 2009/0059017 | A1* | 3/2009 | Kurokawa | H04N 5/23232 348/208.1 |
| 2009/0153680 | A1* | 6/2009 | Shibata | H04N 5/23277 348/208.6 |
| 2010/0225772 | A1* | 9/2010 | Murayama | H04N 5/23254 348/208.4 |
| 2010/0289928 | A1* | 11/2010 | Yano | H04N 5/213 348/241 |
| 2011/0129167 | A1* | 6/2011 | Nojima | H04N 5/23248 382/266 |
| 2012/0033137 | A1* | 2/2012 | Fujiyama | H04N 5/21 348/607 |
| 2012/0269444 | A1* | 10/2012 | Naito | H04N 5/23254 382/197 |
| 2013/0044229 | A1* | 2/2013 | Noguchi | H04N 5/23216 348/208.6 |
| 2013/0083192 | A1* | 4/2013 | Strine | H04N 5/23267 348/143 |
| 2013/0258122 | A1* | 10/2013 | Keane | H04N 5/23267 348/208.4 |
| 2014/0247367 | A1* | 9/2014 | Kusaka | G03B 43/00 348/188 |
| 2014/0293004 | A1* | 10/2014 | Tsubaki | H04N 5/2224 348/43 |
| 2015/0365593 | A1 | 12/2015 | Shinozaki | |
| 2016/0065856 | A1* | 3/2016 | Sohn | H04N 5/23267 348/333.11 |
| 2016/0301872 | A1* | 10/2016 | Kameda | H04N 5/23299 |
| 2017/0155842 | A1* | 6/2017 | Takayanagi | H04N 5/23267 |
| 2018/0063436 | A1* | 3/2018 | Miyazawa | H04N 23/6811 |
| 2018/0205874 | A1* | 7/2018 | Funatsu | H04N 5/232122 |
| 2018/0278846 | A1* | 9/2018 | Manabe | H04N 5/23203 |
| 2018/0278848 | A1* | 9/2018 | Nishiyama | H04N 5/23216 |
| 2018/0309930 | A1* | 10/2018 | Gyotoku | H04N 23/6812 |
| 2019/0008361 | A1* | 1/2019 | Imai | A61B 1/0669 |
| 2019/0142253 | A1* | 5/2019 | Takahashi | G06T 7/20 600/109 |
| 2019/0182426 | A1* | 6/2019 | Higashi | H04N 5/2254 |
| 2019/0200032 | A1* | 6/2019 | Iwamoto | G06T 7/207 |
| 2019/0273860 | A1* | 9/2019 | Miyazawa | H04N 23/60 |
| 2019/0306420 | A1* | 10/2019 | Okaki | H04N 5/23293 |
| 2020/0036895 | A1* | 1/2020 | Midorikawa | G06T 7/215 |
| 2020/0145583 | A1* | 5/2020 | Shanmugam | H04N 5/232935 |
| 2020/0213497 | A1* | 7/2020 | Kubo | H04N 5/2329 |
| 2021/0127053 | A1* | 4/2021 | Sambongi | H04N 23/67 |

FOREIGN PATENT DOCUMENTS

| | | |
|---|---|---|
| CN | 104995905 A | 10/2015 |
| JP | 2008-172667 A | 7/2008 |

\* cited by examiner

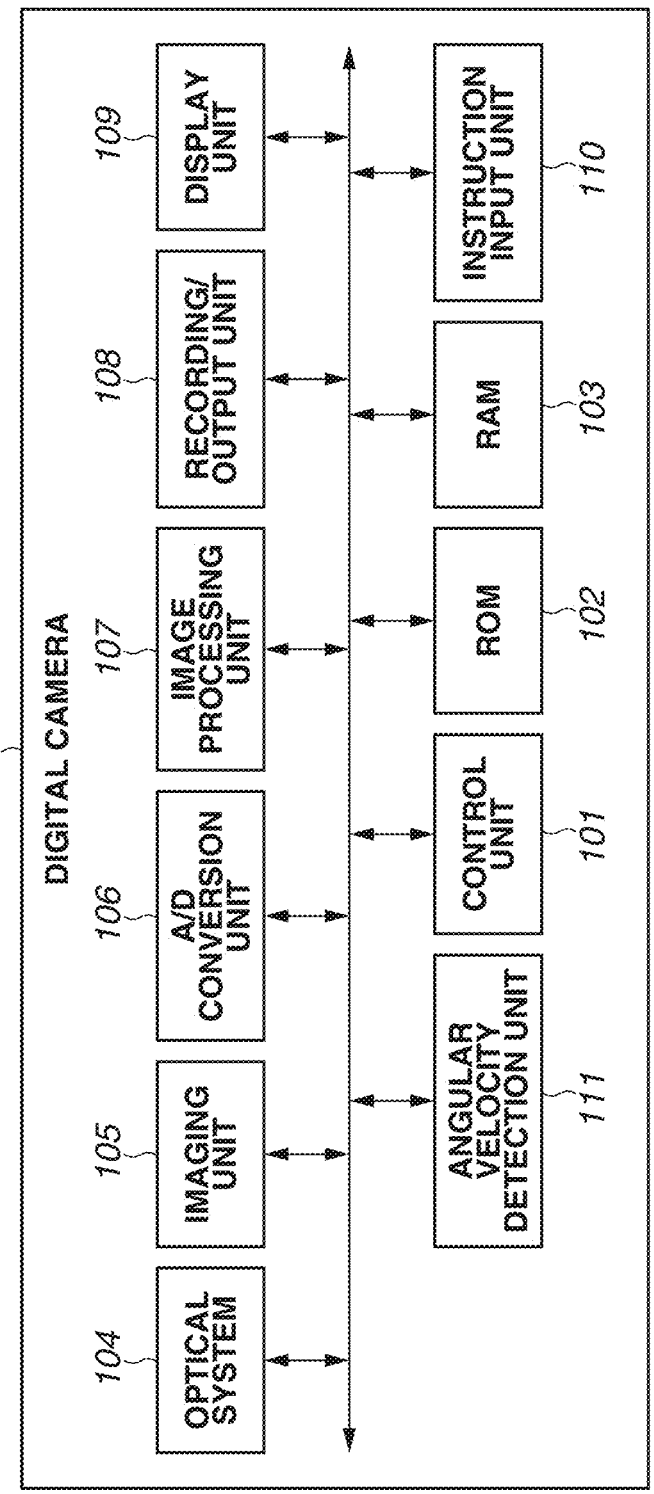

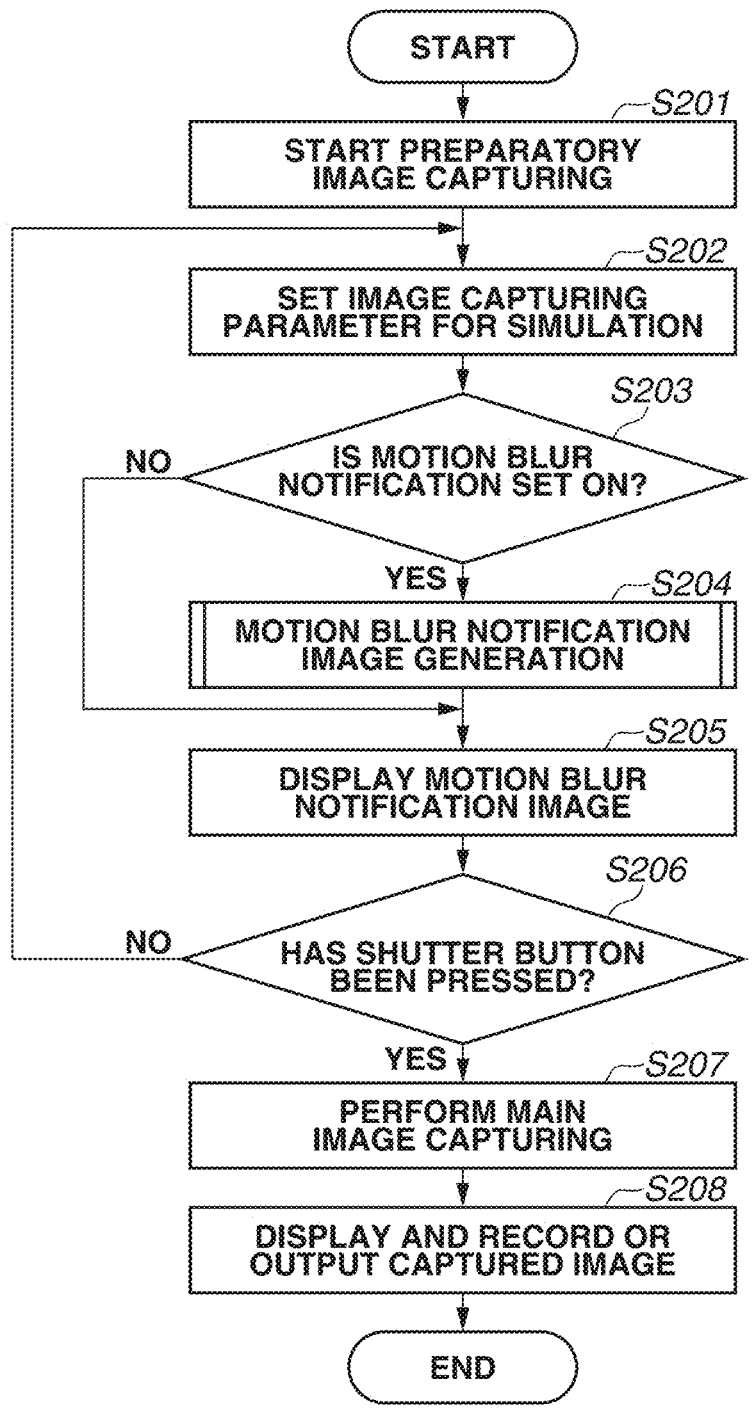

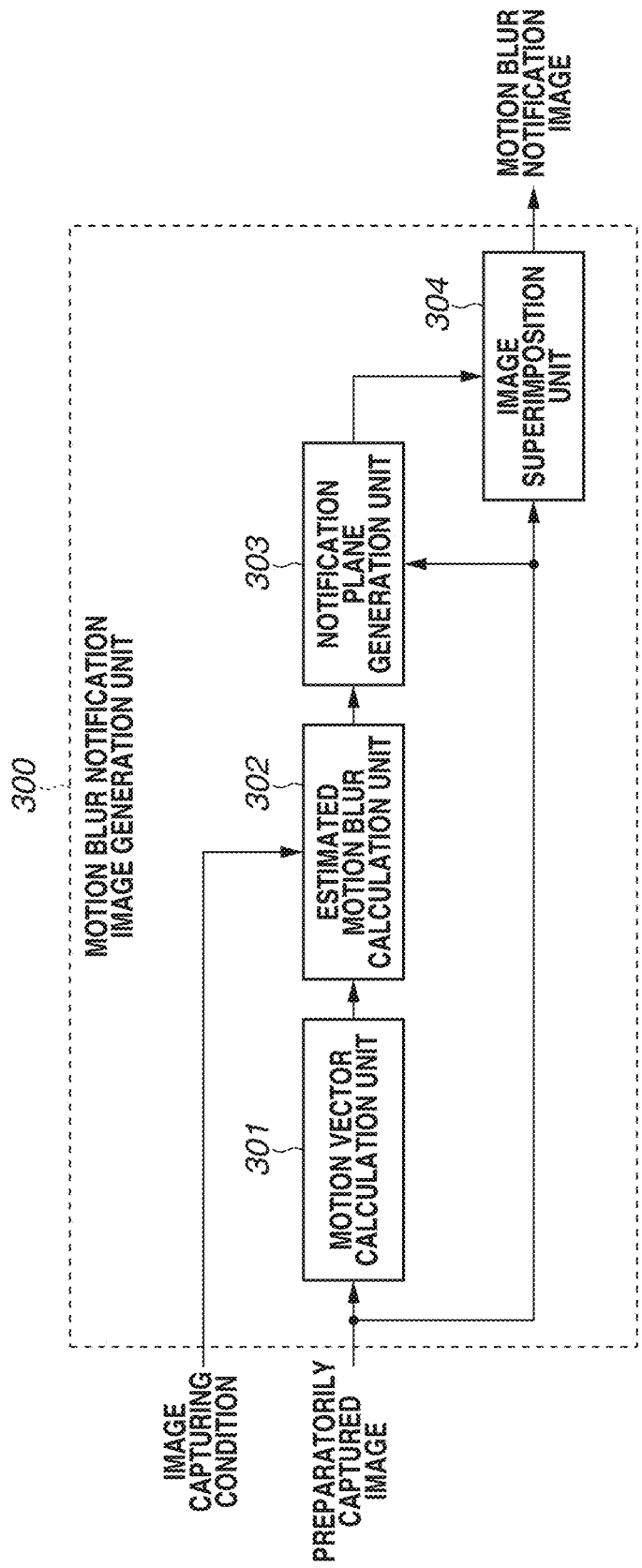

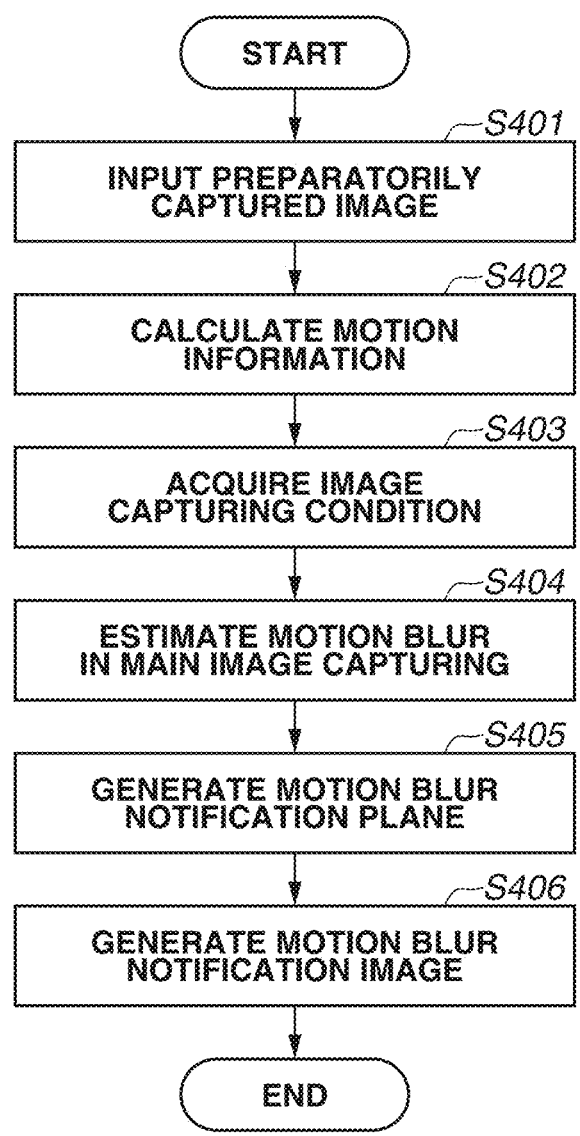

PREPARATORILY CAPTURED IMAGE

MOTION VECTORS

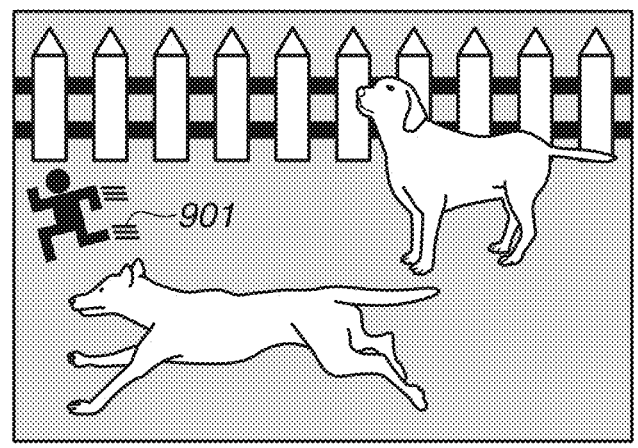
FIG.7A  MOTION BLUR NOTIFICATION ICON
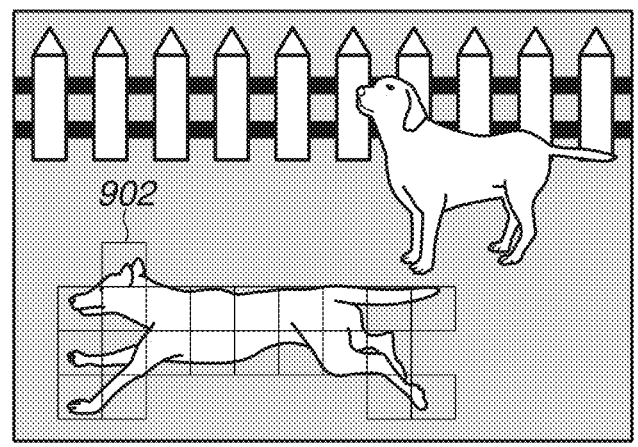
FIG.7B  MOTION BLUR NOTIFICATION FRAME
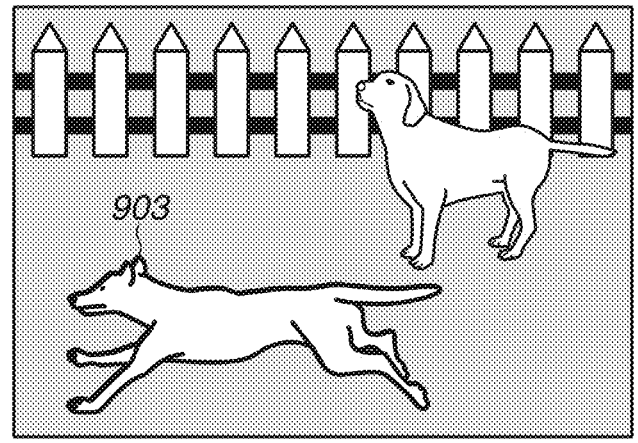
FIG.7C  MOTION BLUR NOTIFICATION EDGE

MOTION INTENSITY

EDGE INTENSITY

MOTION EDGE INTENSITY

CASE WHERE BLUR IS NOT OCCURRING ON PREPARATORILY CAPTURED IMAGE

CASE WHERE BLUR IS OCCURRING ON PREPARATORILY CAPTURED IMAGE

INFORMATION PROCESSING APPARATUS, IMAGING APPARATUS, AND INFORMATION PROCESSING METHOD EACH OF WHICH ISSUES A NOTIFICATION OF BLUR OF AN OBJECT, AND CONTROL METHOD FOR THE IMAGING APPARATUS

BACKGROUND OF THE INVENTION

Field of the Invention

Aspects of the embodiments generally relate to a technique to issue a notification of object blur which occurs in an image that is captured.

Description of the Related Art

Capturing, with a camera, an image of an object that is moving without causing object blur in the image may require performing image capturing with an appropriately set shutter speed.

Japanese Patent Application Laid-Open No. 2008-172667 discusses a technique which enables the operator of an imaging apparatus to visually confirm a motion region in images during preparatory image capturing. The preparatory image capturing as used herein refers to an image capturing operation in which the operator performs a composition adjustment and a setting of image capturing conditions while viewing an electronic viewfinder or back-side liquid crystal display of the imaging apparatus. Japanese Patent Application Laid-Open No. 2008-172667 also discusses a technique which detects a motion region between time-series images captured during preparatory image capturing and display the detected motion region in an emphasized manner.

However, even if the operator visually confirms an image displayed in an electronic viewfinder or back-side liquid crystal display of the imaging apparatus during preparatory image capturing, it is extremely difficult for the operator to check whether motion blur occurs with a set shutter speed. Specifically, it is difficult for the operator to visually confirm motion blur of a small region such as the limbs of a person who is running. Moreover, in a case where respective different shutter speeds are set for main image capturing and preparatory image capturing, since motion blur which may occur differs between main image capturing and preparatory image capturing, even when the operator has visually confirmed an image captured during preparatory image capturing, it is difficult for the operator to confirm motion blur which occurs in main image capturing. For example, when the operator performs main image capturing with a previously set shutter speed different from that set in preparatory image capturing on a running person the image of whom has not blurred during preparatory image capturing, an image of the running person captured in main image capturing may in some cases be recorded in a blurred manner due to the shutter speed for main image capturing being lower relative to the speed of motion of the running person. This is not limited to an issue occurring in a relationship between preparatory image capturing and main image capturing, and a similar issue occurs between a plurality of image capturing operations for which respective image capturing parameters are independently settable.

SUMMARY OF THE INVENTION

According to an aspect of the embodiments, an apparatus includes one or more processors, and a memory storing instructions which, when executed by the one or more processors, cause the information processing apparatus to function as an acquisition unit configured to acquire a first captured image obtained by first image capturing with a first image capturing parameter and motion information about an object in the first captured image, a setting unit configured to set a second image capturing parameter, an estimation unit configured to estimate motion blur of an object in a second captured image which is obtained in a case where second image capturing is performed with the second image capturing parameter, based on the motion information and the second image capturing parameter, and a notification unit configured to issue a notification of the motion blur.

According to another aspect of the embodiments, an apparatus which includes an imaging unit and which, in a case where an image capturing instruction is issued by an operator while a first captured image obtained by first image capturing with a first image capturing parameter in the imaging unit is sequentially output, outputs a second captured image obtained by second image capturing with a second image capturing parameter in response to the image capturing instruction includes one or more processors, and a memory storing instructions which, when executed by the one or more processors, cause the apparatus to function as a calculation unit configured to calculate motion information based on a plurality of first captured images each corresponding to the first captured image output from the imaging unit, a setting unit configured to set the second image capturing parameter, an estimation unit configured to estimate motion blur in the second captured image based on the motion information and the second image capturing parameter, and a notification unit configured to issue a notification of the estimated motion blur prior to receiving the image capturing instruction.

According to yet another aspect of the embodiments, a method includes acquiring a first captured image obtained by first image capturing with a first image capturing parameter and motion information about an object in the first captured image, setting a second image capturing parameter, estimating motion blur of an object in a second captured image which is obtained in a case where second image capturing is performed with the second image capturing parameter, based on the motion information and the second image capturing parameter, and issuing a notification of the motion blur.

According to yet another aspect of the embodiments, a method for an apparatus which includes an imaging unit and which, in a case where an image capturing instruction is issued by an operator while a first captured image obtained by first image capturing with a first image capturing parameter in the imaging unit is sequentially output, outputs a second captured image obtained by second image capturing with a second image capturing parameter in response to the image capturing instruction includes calculating motion information based on a plurality of first captured images each corresponding to the first captured image output from the imaging unit, setting the second image capturing parameter, estimating motion blur in the second captured image based on the motion information and the second image capturing parameter, and issuing a notification of the estimated motion blur prior to receiving the image capturing instruction.

Further features of the disclosure will become apparent from the following description of exemplary embodiments with reference to the attached drawings.

BRIEF DESCRIPTION OF THE DRAWINGS

FIG. 1 is a diagram illustrating an imaging apparatus in a first exemplary embodiment.

FIG. 2 is a flowchart illustrating an image capturing processing flow of a digital camera in the first exemplary embodiment.

FIG. 3 is a diagram illustrating a configuration example of a motion blur notification image generation unit in the first exemplary embodiment.

FIG. 4 is a flowchart illustrating a processing flow for generating a motion blur notification image in the first exemplary embodiment.

FIGS. 7A, 7B, and 7C are diagrams illustrating motion blur notification methods in the first exemplary embodiment.

DESCRIPTION OF THE EMBODIMENTS

Figure 5A:
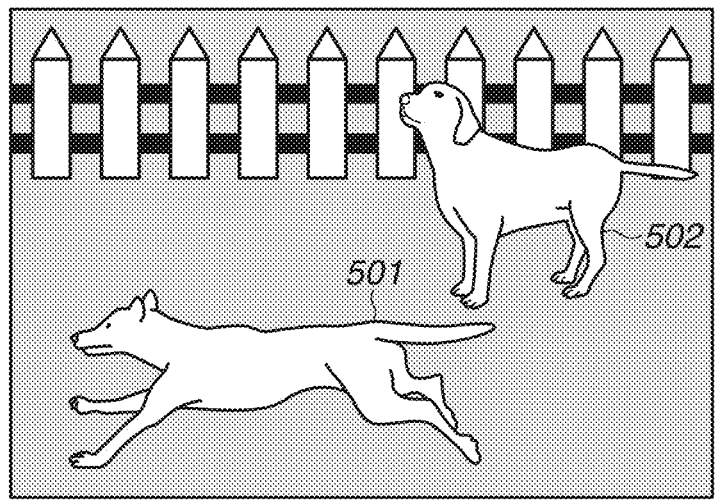
FIGS. 5A and 5B are diagrams illustrating a preparatorily captured image and motion vectors, respectively, in the first exemplary embodiment.

Various exemplary embodiments, features, and aspects of the disclosure will be described in detail below with reference to the drawings.

A first exemplary embodiment is configured to estimate motion blur which occurs when image capturing is performed with an image capturing parameter set independent of first image capturing, based on motion information about an object acquired in performing the first image capturing, and issue a notification of the estimated motion blur.

FIG. 1 is a block diagram illustrating a digital camera equipped with an imaging unit, which serves as an example of each of an information processing apparatus and an imaging apparatus according to the first exemplary embodiment. The information processing apparatus as set forth in the present exemplary embodiment can also be applied to any electronic apparatus capable of processing a captured image. Examples of such an electronic apparatus can include a mobile phone, a gaming machine, a tablet terminal, a personal computer, and a watch-type or spectacle-type information terminal.

A control unit 101, which is, for example, a central processing unit (CPU), reads out a control program, which is provided to control various blocks included in the digital camera 100, from a read-only memory (ROM) 102, loads the control program onto a random access memory (RAM) 103 described below, and executes the control program. With this, the control unit 101 controls operations of the respective blocks included in the digital camera 100.

The ROM 102, which is an electrically erasable and recordable non-volatile memory, stores, in addition to operation programs for the respective blocks included in the digital camera 100, for example, parameters needed for operations of the respective blocks.

The RAM 103, which is a rewritable volatile memory, is used for, for example, loading of programs which, for example, the control unit 101 executes and temporary storing of pieces of data, for example, generated by operations of the respective blocks included in the digital camera 100.

An optical system 104, which is configured with a group of lenses including a zoom lens and a focus lens, forms an object image on the imaging plane of an imaging unit 105 described below.

The imaging unit 105, which is an image sensor, such as a charge-coupled device (CCD) sensor or complementary metal-oxide semiconductor (CMOS) sensor, photoelectrically converts an optical image formed on the imaging plane of the imaging unit 105 by the optical system 104 and outputs the obtained analog image signal to an analog-digital (A/D) conversion unit 106.

The A/D conversion unit 106 converts the input analog image signal into digital image data. The digital image data output from the A/D conversion unit 106 is temporarily stored in the RAM 103.

An image processing unit 107 performs various processing operations on image data stored in the RAM 103. Specifically, the image processing unit 107 performs various image processing operations for developing digital image data and displaying or recording the developed digital image data, such as defect correction processing for pixels caused by the optical system 104 or the image sensor, demosaicing processing, white balance correction processing, color interpolation processing, and gamma processing.

Moreover, the image processing unit 107 includes a motion blur notification image generation unit 300 (FIG. 3). In the first exemplary embodiment, the motion blur notification image generation unit 300 generates a motion blur notification image by generating and superimposing an image plane, which enables readily confirming motion blur based on the obtained information about motion blur of an object, on image data stored in the RAM 103.

A recording/output unit 108 records data including image data on a recording medium such as a removable memory card or outputs the data to an external apparatus via an external interface. The recording/output unit 108 records, as a recorded image, image data processed by the image processing unit 107 via the RAM 103.

A display unit 109, which includes a display device such as a liquid crystal display (LCD), displays an image stored in the RAM 103 or an image recorded on the recording/ output unit 108 on the display device. Moreover, the display unit 109 also displays, for example, an operation user interface for receiving an instruction from the operator. Additionally, the display unit 109 can include a plurality of display devices, such as an electronic viewfinder (EVF) and a back-side monitor provided at the operator side (back side). The display unit 109 can be configured to allow simultaneous outputting to a plurality of display devices or selective outputting to one of the plurality of display devices by switching.

An instruction input unit 110 is an input interface including various physical operation members, such as a touch panel and a shutter button, and receives inputting of instructions from the operator.

An angular velocity detection unit 111, which is, for example, an angular velocity sensor, detects an angular velocity of the main body of the digital camera 100 in the yaw direction and the pitch direction caused by camera shake or camera work. The angular velocity detection method for use in the angular velocity detection unit 111 is assumed to be an existing method, and the detailed description thereof is omitted.

Moreover, the digital camera 100 performs, under the control of the control unit 101, preparatory image capturing (live view image capturing), which sequentially displays an analog image signal sequentially output from the imaging unit 105 on the display device via the A/D conversion unit 106, the RAM 103, the image processing unit 107, and the display unit 109. During preparatory image capturing, the operator is able to make preparations for image capturing, such as adjusting a composition in preparation for main image capturing, which is directed to recording on a recording medium or outputting to an external apparatus, or changing image capturing parameters for main image capturing, such as an exposure time (Tv value), an aperture value (Av value), and ISO sensitivity.

Next, processing which is performed by the digital camera 100 in the first exemplary embodiment is described in detail with reference to the flowchart of FIG. 2. Steps in the flowchart of FIG. 2 are performed by the control unit 101 or performed by the applicable units of the digital camera 100 in response to instructions from the control unit 101.

When the digital camera 100 is powered on by the operator, then in step S201, the control unit 101 starts preparatory image capturing by controlling the optical system 104 and the imaging unit 105 in response to the digital camera 100 being powered on. During preparatory image capturing, the digital camera 100 sequentially captures an image to sequentially acquire a captured image, and the captured image is displayed on the display device of the display unit 109. The operator can perform, for example, a composition adjustment while confirming a preparatorily captured image which is sequentially displayed. Furthermore, processing operations in steps S202, S203, S204, S205, and S206 described below are performed during preparatory image capturing.

In step S202, the operator inputs an image capturing parameter for simulation with use of the instruction input unit 110. In response to an input from the instruction input unit 110, the control unit 101 sets the image capturing parameter for simulation independent of an image capturing parameter for preparatory image capturing. Here, the control unit 101 can be configured to automatically set, for example, an image capturing parameter which seems to be suited for a detected object model, with use of, for example, known image analysis or object analyses. In the first exemplary embodiment, an exposure time is settable as the image capturing parameter for simulation.

Moreover, in the first exemplary embodiment, the image capturing parameter for simulation, which the control unit 101 sets, is assumed to be used as an image capturing parameter for main image capturing after pressing of a shutter button described below (an instruction for main image capturing) is detected. However, the first exemplary embodiment is not limited to this, but a configuration in which the control unit 101 sets the image capturing parameter for main image capturing independently based on a further separate instruction from the operator or in an automatic manner can be employed.

In step S203, the control unit 101 determines whether setting of motion blur notification is ON or OFF. For example, whether to set motion blur notification ON or OFF can be set by the operator with use of the instruction input unit 110 or whether to set motion blur notification ON or OFF can be set automatically based on some kind of image capturing condition. A configuration in which one physical operation member (for example, a button or bar) or one icon on a touch device is able to be used to set ON or OFF and the operator is able to set ON or OFF at any timing during preparatory image capturing can be employed. Additionally, a configuration in which setting for displaying while periodically switching ON and OFF of displaying is available can be employed.

If, in step S203, it is determined that setting of motion blur notification is ON (YES in step S203), the control unit 101 advances the processing to step S204. In step S204, the motion blur notification image generation unit 300 generates a motion blur notification image obtained by superimposing, on the preparatorily captured image, a motion blur notification plane used to issue a notification of motion blur (or absence of motion blur) which occurs in an object image when image capturing is performed with an image capturing parameter for main image capturing. Then, in step S205, the control unit 101 displays the motion blur notification image on the display device of the display unit 109.

If, in step S203, it is determined that setting of motion blur notification is OFF (NO in step S203), then in step S205, the control unit 101 displays, on the display unit 109, a preparatorily captured image on which the motion blur notification plane is not superimposed.

In step S206, the control unit 101 determines whether the shutter button of the instruction input unit 110 has been pressed by the operation of the operator. Here, in a case where the input of pressing of the shutter button is configured to receive a two-stage input method including, for example, half-press for issuing an instruction for an image capturing preparatory operation and full-press for issuing an instruction for a main image capturing operation, the control unit 101 determines whether full-press has been performed. In a case where only a simple single-stage input is received, the control unit 101 determines whether the single-stage input has been performed.

If it is determined that the shutter button has not been pressed (NO in step S206), the control unit 101 returns the processing to step S202, and then repeats processing operations in steps S202 to S206. This enables the operator to, even during preparatory image capturing, readily confirm motion blur which occurs in an object image when main image capturing is performed with the currently set image capturing parameter. If motion blur is confirmed and in a case where the confirmed motion blur is not motion blur favored by the operator (in a case where the occurrence of motion blur is not desired), the operator re-sets the shutter speed (exposure time) for main image capturing without pressing the shutter button.

In this way, issuing a notification of motion blur occurring in an object image during preparatory image capturing enables the operator to, while confirming a motion blur notification image displayed on the display unit 109, repeat setting of an exposure time for main image capturing until the motion blur favored by the operator is obtained. Then, the operator is enabled to receive a shutter opportunity in a state in which setting of an exposure time corresponding to the appropriate motion blur has been reached.

If, in step S206, it is determined that the shutter button has been pressed (YES in step S206), the control unit 101 determines that an image capturing instruction for main image capturing has been received and then advances the processing to step S207, in which the control unit 101 performs main image capturing based on the image capturing parameter set until preparatory image capturing, by controlling, for example, the optical system 104 and the imaging unit 105. In step S208, the control unit 101 outputs a main captured image obtained by main image capturing to the display unit 109 and the recording/output unit 108, thus displaying the main captured image on the display device of the display unit 109 and recording the main captured image on the recording/output unit 108 or outputting the main captured image from the recording/output unit 108 to an external apparatus.

Next, a configuration example of the motion blur notification image generation unit 300 included in the image processing unit 107, which is a characterizing portion of the first exemplary embodiment, is described with reference to FIG. 3.

FIG. 3 is a diagram illustrating a configuration example of the motion blur notification image generation unit 300. The motion blur notification image generation unit 300 includes a motion vector calculation unit 301, which calculates motion vectors of an object by making a comparison between images, and an estimated motion blur calculation unit 302, which estimates motion blur in an object image which may occur during main image capturing, based on the calculated motion vectors. Additionally, the motion blur notification image generation unit 300 further includes a notification plane generation unit 303, which generates data for issuing a notification of motion blur based on the estimated motion blur in an object image, and an image superimposition unit 304, which performs superimposition processing for superimposing the motion blur notification plane on a captured image in the first exemplary embodiment. Details of an operation of each of the above-mentioned units are described below.

Furthermore, one or more of the functional blocks illustrated in FIG. 3 can be implemented by hardware, such as an application specific integrated circuit (ASIC) or a programmable logic array (PLA), or can be implemented by a programmable processor, such as a CPU or a micro processing unit (MPU), executing software. Moreover, one or more of the functional blocks can be implemented by a combination of software and hardware. Accordingly, in the following description, even in a case where different functional blocks are described as subjects of operation, the same hardware can be implemented as a subject.

Next, processing which is performed in step S204 illustrated in FIG. 2, which the motion blur notification image generation unit 300 performs to generate a motion blur notification image, is described in detail with reference to the flowchart of FIG. 4. Steps in the flowchart of FIG. 4 are performed by the control unit 101 or performed by the applicable units of the digital camera 100, including the motion blur notification image generation unit 300, in response to instructions from the control unit 101.

In step S401, the control unit 101 inputs a preparatorily captured image which is sequentially captured by the imaging unit 105 and an image capturing parameter which is used for main image capturing to the motion blur notification image generation unit 300.

In step S402, the motion vector calculation unit 301 calculates motion vectors between images of preparatory image capturing as motion information of an object by performing comparison processing between images. The motion vectors represent, as vectors, the amount of movement of an object between images of preparatory image capturing. In the first exemplary embodiment, the motion vector calculation unit 301 calculates motion vectors of an object in a plane between two-dimensional images. However, the first exemplary embodiment is not limited to this, but the motion vector calculation unit 301 can be configured to, for example, acquire depth information (for example, an object distance or a defocus amount) in the depth direction of an object in each preparatorily captured image and thus calculate motion vectors of the object on a three-dimensional space.

The motion vector calculation unit 301 sets a plurality of preparatorily captured images as a base frame and a reference frame, and performs a correlation calculation between a base block in the base frame and each block of a target region in the reference frame. The motion vector calculation unit 301 calculates motion vectors based on a positional relationship between the block highest in correlation as a result of the correlation calculation and the base block. The method of calculating a correlation value is not specifically limited but can be, for example, methods that are based on the sum of absolute differences, the sum of squared differences, and a normalized cross-correlation value, and the method of calculating motion vectors itself can be another method such as the gradient method.

Figure 5B:
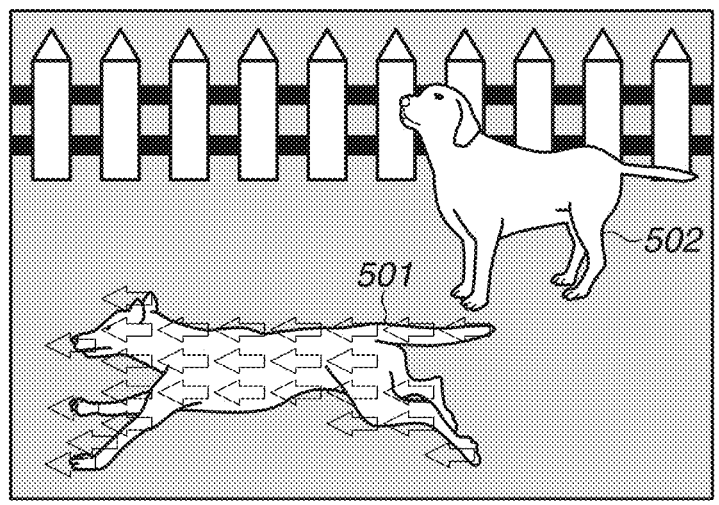

FIG. 5A illustrates a preparatorily captured image obtained by performing image capturing on a dog 501 which is running to the left, and FIG. 5B is an imaginary diagram of motion vectors which are calculated at that time. In the example illustrated in FIG. 5B, with regard to the dog 501 which is running, motion vectors with sizes of a predetermined value or more are detected as leftward motion vectors, and, with regard to another dog 502 which stands still and a background fence, the values of motion vectors are zero or smaller than the predetermined value.

Furthermore, instead of calculating motion vectors of all of the pixels, the motion vector calculation unit 301 can calculate motion vectors for every predetermined pixels.

In step S403 illustrated in FIG. 4, the estimated motion blur calculation unit 302 acquires, as an image capturing condition, an exposure time for main image capturing set in step S202 illustrated in FIG. 2 and a time interval (frame rate) between images in preparatory image capturing.

In step S404, the estimated motion blur calculation unit 302 estimates motion blur of an object in main image capturing from motion vectors for every pixel calculated in step S402, based on the exposure time for main image capturing and the time interval between images in preparatory image capturing acquired in step S403.

Figure 6:
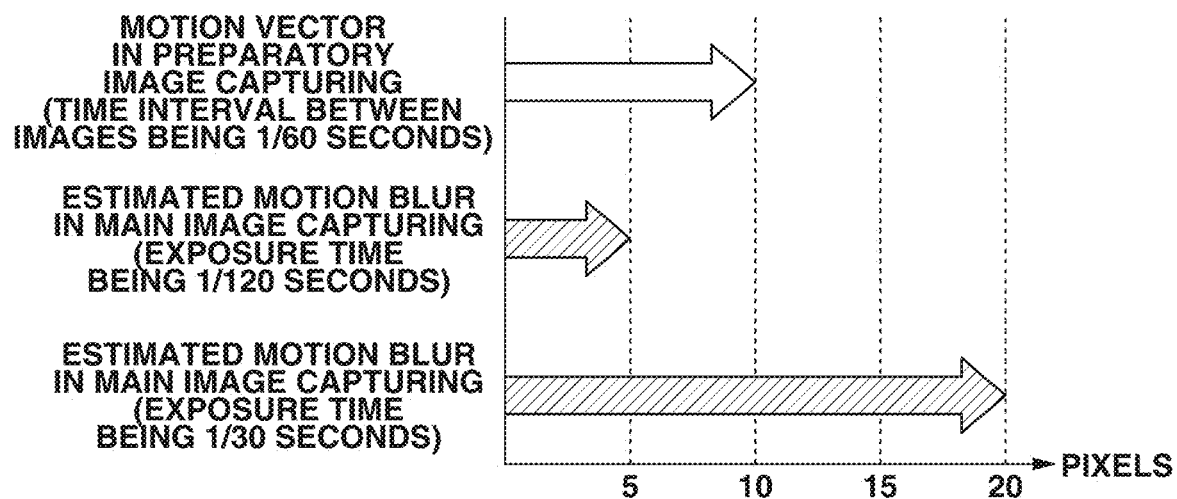
FIG. 6 is an imagery diagram illustrating a motion vector and estimated motion blurs in the first exemplary embodiment.

A method of estimating motion blur of an object in main image capturing is described in detail with reference to FIG. 6. FIG. 6 is a diagram illustrating a relationship between a motion vector in preparatory image capturing and estimated motion blur estimated as motion blur in main image capturing. In FIG. 6, an example in which, as each image capturing condition, the time interval between images of preparatory image capturing is 1/60 seconds and the exposure times for main image capturing are 1/120 seconds and 1/30 seconds is illustrated.

The estimated motion blur calculation unit 302 estimates motion blur in main image capturing from motion vectors for every pixel based on conversion formulae such as the following formula (1) and formula (2).

$$CONV\_GAIN = EXP\_TIME/INT\_TIME \quad (1)$$

$$CONV\_BLUR = VEC\_LEN \times CONV\_GAIN \quad (2)$$

Here, in formula (1), CONV_GAIN denotes an estimation gain for converting the magnitude of a motion vector in preparatory image capturing into the magnitude of a motion vector in main image capturing, EXP_TIME denotes an exposure time for main image capturing, and INT_TIME denotes a time interval between images of preparatory image capturing. Moreover, in formula (2), CONV_BLUR denotes motion blur of an object in main image capturing, and VEC_LEN denotes the magnitude of a motion vector in preparatory image capturing.

In formula (1), the estimation gain is calculated by dividing an exposure time for main image capturing by a time interval between images of preparatory image capturing. Then, in formula (2), motion blur of an object in main image capturing is calculated by multiplying the magnitude of a motion vector by the estimation gain.

Specifically, as illustrated in FIG. 6, in a case where the length of a motion vector in preparatory image capturing is 10 pixels, the estimated motion blur in main image capturing with an exposure time of 1/120 seconds becomes 5 pixels because the estimation gain is ½ times. Moreover, the estimated motion blur in main image capturing with an exposure time of ⅓ seconds becomes 20 pixels because the estimation gain is 2 times.

In step S405, the notification plane generation unit 303 generates an image plane used for issuing a notification of motion blur, based on motion blur for every pixel calculated in step S404. For example, the notification plane generation unit 303 generates an image plane used for issuing a notification of motion blur in such a discriminable manner as to emphasize displaying of pixels corresponding to motion blur with a predetermined amount of blur or more.

Moreover, during a period until pressing of the shutter button is detected in step S206 illustrated in FIG. 2 and main image capturing is then performed, the operator is allowed to change an image capturing parameter, such as the shutter speed, to obtain a captured image in main image capturing with the motion blur. If the image capturing parameter is changed, the estimated motion blur calculation unit 302 re-performs an estimation of motion blur. The notification plane generation unit 303 re-generates an image plane based on the re-estimated motion blur.

In step S406, the image superimposition unit 304 generates a motion blur notification image by superimposing the notification plane generated in step S405 on the preparatorily captured image, for example, in the RAM 103.

Here, the method of generating an notification plane used for issuing a notification of motion blur of an object, which is generated by the notification plane generation unit 303, and the method of generating a motion blur notification image obtained by superimposition of the notification plane are described in detail with reference to FIGS. 7A, 7B, and 7C. FIGS. 7A to 7C illustrate three examples of the motion blur notification image. In these examples, displaying the motion blur notification image on the display unit 109 during preparatory image capturing enables the operator to readily confirm motion blur of an object.

FIG. 7A illustrates an example of issuing a notification of motion blur with displaying of an icon. In step S405, the control unit 101 calculates the proportion of the number of pixels exhibiting estimated motion blur with a predetermined value or more, out of estimated motion blurs for every pixel, to the entire image screen. In a case where the calculated proportion is greater than or equal to a predetermined proportion, the notification plane generation unit 303 generates, as a motion blur notification plane, a motion blur notification icon 901 such as that illustrated in FIG. 7A, and the image superimposition unit 304 generates a motion blur notification image such as that illustrated in FIG. 7A by superimposing the motion blur notification icon 901 on the preparatorily captured image.

FIG. 7B illustrates an example of issuing a notification of motion blur with displaying of a motion blur frame. Here, the method of generating a motion blur notification image in which a motion blur frame is displayed is described. In step S405, the control unit 101 calculates the proportion of the number of pixels exhibiting estimated motion blur with a predetermined value or more, out of estimated motion blurs for every pixel within a segmented region, to the entire segmented region. With respect to segmented regions in which the calculated proportion is greater than or equal to a predetermined proportion, the notification plane generation unit 303 generates, as a motion blur notification plane, a motion blur notification frame 902 such as that illustrated in FIG. 7B, and the image superimposition unit 304 generates a motion blur notification image such as that illustrated in FIG. 7B by superimposing the motion blur notification frame 902 on the preparatorily captured image. Whether to issue a notification of motion blur for each segmented region can be determined based on a statistical value such as an average value or median value of estimated motion blurs for every pixel in the segmented region.

FIG. 7C illustrates an example of issuing a notification of motion blur by displaying, in an emphasized manner, the edge of an object on which motion blur has occurred. Here, the method of generating a motion blur notification image using emphasized displaying of a motion blur edge is described. In step S405, the notification plane generation unit 303 detects an edge intensity of the preparatorily captured image. The detection of the edge intensity can be performed by using a known technique such as Sobel filter, and the detailed description thereof is omitted. Then, the notification plane generation unit 303 extracts pixels the edge intensity of which is a predetermined value or more and the estimated motion blur of which is a predetermined value or more (for example, clips the result of the above-mentioned filter with a predetermined value or more). With respect to the extracted pixels, the notification plane generation unit 303 generates such a motion blur notification plane as to display, in an emphasized manner, the edge of an object on which motion blur is occurring, such as a motion blur notification edge 903 illustrated in FIG. 7C, and then generates a motion blur notification image such as that illustrated in FIG. 7C by superimposing the motion blur notification plane on the preparatorily captured image. In the example illustrated in FIG. 7C, the motion blur notification edge 903 is made thick. The other examples of the method for emphasized displaying include methods of changing hue, saturation, or brightness such as a method of extracting pixels the edge intensity of which is a predetermined value or more and the estimated motion blur of which is a predetermined value or more and making the extracted pixels red.

As described above, the first exemplary embodiment is configured to estimate motion blur in second image capturing from motion blur in first image capturing and issue a notification of the estimated motion blur, thus enabling the operator to readily confirm motion blur of an object which occurs in the second image capturing when an image obtained by the first image capturing is displayed. The operator is enabled to confirm whether it is possible to perform image capturing with motion blur with use of a current image capturing parameter for use in the second image capturing, at the time of the first image capturing and set an image capturing parameter for the second image capturing.

While, in the first exemplary embodiment, an example of issuing a notification of motion blur in a case where the estimated motion blur is a predetermined value or more has been described, a notification of motion blur can also be issued in a case where the estimated motion blur is a predetermined value or less. With this, in the case of long-exposure image capturing in which motion blur is intended to be expressed as dynamic feeling, the operator becomes able to readily confirm any insufficient motion blur during the period of preparatory image capturing.

Moreover, in the first exemplary embodiment, a notification of motion blur is started in response to preparatory image capturing being started after the digital camera 100 is powered on. However, the first exemplary embodiment is not limited to this, and a configuration in which, for example, in a case where the shutter button is half-pressed during preparatory image capturing, a notification of motion blur is issued during the period in which the shutter button is half-pressed or for a predetermined period of time can be employed. Moreover, an operation member which is able to be operated to freely switch between ON and OFF of a notification of motion blur during preparatory image capturing can be provided.

Moreover, the first exemplary embodiment is configured to estimate motion blur in main image capturing based on motion vectors obtained in preparatory image capturing. However, the first exemplary embodiment is not limited to this, but can be configured to, for example, predict motion vectors in main image capturing according to motion vectors obtained in preparatory image capturing and then estimate motion blur in main image capturing based on the predicted motion vectors. The method of predicting motion vectors in main image capturing includes, for example, performing prediction based on a temporal change in motion vectors in preparatory image capturing and a time that elapses before main image capturing. That method is particularly effective for a case where a time that elapses from preparatory image capturing until main image capturing is previously determined, such as the case of self-timer image capturing or the case of automatic image capturing in which an imaging apparatus discriminates a shutter opportunity and automatically performs image capturing.

Moreover, the first exemplary embodiment is configured to estimate motion blur in second image capturing (main image capturing) by, in consideration of an exposure time as a different image capturing parameter, converting motion blur in first image capturing (preparatory image capturing) into motion blur in second image capturing. However, the image capturing parameter to be taken into consideration is not limited to an exposure time, and, since a brighter image makes motion blur more easily conspicuous, a configuration in which a threshold value used to determine whether the current motion blur is motion blur a notification of which is to be issued is set lower in the case of a high-exposed image than in the case of a low-exposed image based on an exposure value (Ev value) of each image can also be employed.

Moreover, while, in the first exemplary embodiment, three examples of emphasized displaying, i.e., motion blur notification icon display, motion blur notification frame display, and motion blur notification edge display, have been described as the method for motion blur notification, the method for motion blur notification is not limited to this. For example, a region on which motion blur is occurring, including a flat region, can be displayed in an emphasized manner. Specifically, The notification plane generation unit 303 performs such emphasized display as to redden pixels the estimated motion blur of which for every pixel is a predetermined value or more. In this way, performing emphasized displaying of not only an edge region but also a region other than the edge region causes the entire object to be displayed in an emphasized manner and thus enables the operator to readily confirm motion blur.

Moreover, while, in the first exemplary embodiment, an example of performing displaying to issue a notification of motion blur on the display unit 109 has been described as the method for motion blur notification, the method for motion blur notification is not limited to this. For example, a notification of motion blur can be issued by using sound, light, or vibration. Specifically, in a case where the proportion of the number of pixels exhibiting estimated motion blur with a predetermined value or more, out of estimated motion blurs for every pixel, to the entire image screen is greater than or equal to a predetermined proportion, motion blur notification sound, motion blur notification light, or motion blur notification vibration is generated. In this modification example, a configuration for the notification plane generation unit 303 and the image superimposition unit 304 and a processing flow of step S405 and step S406 become unnecessary. Instead, a loudspeaker can be mounted in the digital camera 100, and, in parallel with displaying of a preparatorily captured image on the display unit 109 in step S205, the control unit 101 can generate notification sound with the loudspeaker, can cause notification light to be emitted, or can produce notification vibration.

Moreover, while, in the first exemplary embodiment, an example of, when displaying a preparatorily captured image, issuing a notification of motion blur of an object which occurs in a main captured image has been described, a relationship between the two captured images or image capturing parameters is not limited to this. In other words, an exemplary embodiment in which, under a condition that a plurality of image sensors is used for image capturing, one image sensor causes a first captured image to be output by first image capturing with a first image capturing parameter and the other image sensor causes a second captured image to be output by second image capturing with a second image capturing parameter can be employed. In this case, motion blur of an object in the second captured image is also estimated based on motion information about the first captured image, and a notification thereof is also issued. The plurality of image sensors can be separately mounted on a plurality of imaging apparatuses.

Moreover, while, in the first exemplary embodiment, an example of issuing a notification of estimated motion blur has been described, the first exemplary embodiment is not limited to this, and the estimated motion blur can also be used for image capturing control, such as for determining an image capturing instruction. For example, such control as not to receive an image capturing start instruction in a case where an amount of motion blur is not yet reached is conceivable.

In view of the fact that, due to the motion of an imaging apparatus caused by, for example, camera shake, motion blur also prevents an image from being obtained, a second exemplary embodiment described below is configured to estimate motion blur of an object caused by the motion of an imaging apparatus in second image capturing from motion information about the imaging apparatus in first image capturing and then issue a notification of the estimated motion blur. Furthermore, elements assigned with the respective same reference characters as those in the first exemplary embodiment are assumed to perform similar actions and processing operations to those in the first exemplary embodiment, and are, therefore, omitted from description here.

Figure 8:
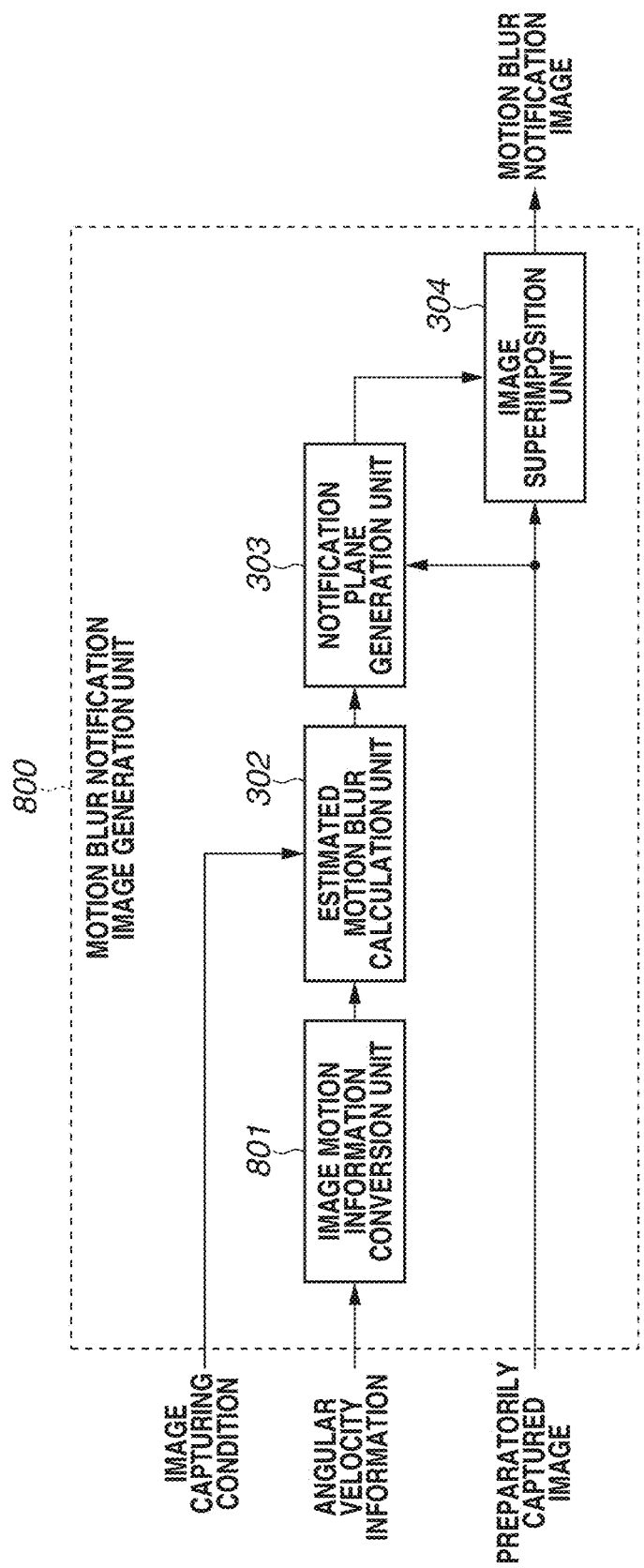
FIG. 8 is a diagram illustrating a configuration example of a motion blur notification image generation unit in a second exemplary embodiment.

FIG. 8 is a diagram illustrating a configuration example of a motion blur notification image generation unit 800 included in the image processing unit 107. The motion blur notification image generation unit 800 includes an image motion information conversion unit 801, an estimated motion blur calculation unit 302, a notification plane generation unit 303, and an image superimposition unit 304. Actions and processing operations of other than the image motion information conversion unit 801 are similar to those in the first exemplary embodiment, and are, therefore, omitted from description here.

Figure 9:
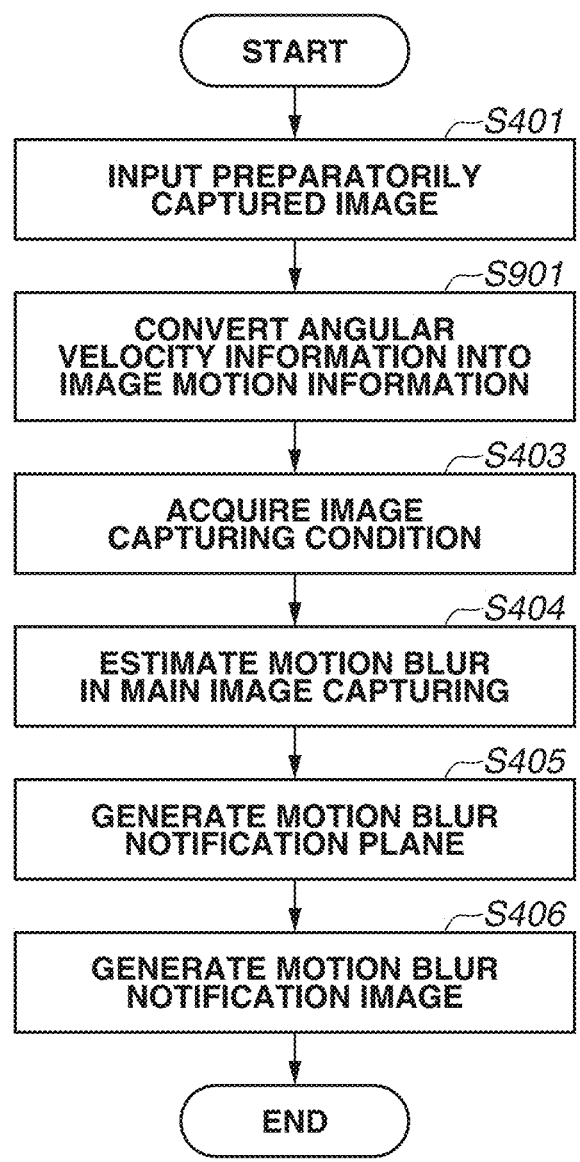
FIG. 9 is a flowchart illustrating a processing flow for generating a motion blur notification image in the second exemplary embodiment.

Next, processing which the motion blur notification image generation unit 800 performs to generate a motion blur notification image is described in detail with reference to the flowchart of FIG. 9. Steps in the flowchart of FIG. 9 are performed by the control unit 101 or performed by the applicable units of the digital camera 100, including the motion blur notification image generation unit 800, in response to instructions from the control unit 101.

In step S901, the image motion information conversion unit 801 converts angular velocity information detected by the angular velocity detection unit 111 into motion information on an image. Approximate conversion formulae for converting an angular velocity into motion information are shown as the following formulae (3) and (4).

$$\text{MOV\_yaw} \approx \frac{f \tan\left(-\frac{\omega\_yaw}{fps}\right)}{pp} \quad (3)$$

$$\text{MOV\_pitch} \approx \frac{f \tan\left(-\frac{\omega\_pitch}{fps}\right)}{pp} \quad (4)$$

MOV_yaw denotes the amount of movement in the yaw direction, and MOV_pitch denotes the amount of movement in the pitch direction. Moreover, f denotes the focal length, ω_yaw denotes the angular velocity in the yaw direction, ω_pitch denotes the angular velocity in the pitch direction, fps denotes the frame rate of preparatory image capturing, and pp denotes the pixel pitch of the imaging unit 105. Conversion formulae shown as formulae (3) and (4) act to calculate the amounts of movement (the numbers of pixels corresponding to movement) on an image by calculating the amount of movement on an imaging plane based on an angle made by movement at a time interval between images in preparatory image capturing and the focal length and dividing the calculated amount of movement on the imaging plane by a pixel pitch in each of the yaw direction and the pitch direction. Furthermore, the amount of movement on an image calculated here is not the amount of movement which differs for each pixel but the amount of movement which is uniform for all of the pixels.

The image motion information conversion unit 801 regards the amount of movement in the yaw direction as the amount of movement in horizontal direction and regards the amount of movement in the pitch direction as the amount of movement in vertical direction, and thus outputs the amounts of movement as motion vectors which are uniform for all of the pixels to the estimated motion blur calculation unit 302.

In step S404, as with the first exemplary embodiment, the estimated motion blur calculation unit 302 estimates motion blur in main image capturing with use of the motion vectors calculated in step S901, and, in step S405, the notification plane generation unit 303 generates a motion blur notification plane. Then, in step S406, the image superimposition unit 304 generates a motion blur notification image. As described above, the second exemplary embodiment is configured to estimate motion blur of an object caused by the movement of an imaging apparatus in second image capturing from motion information about the imaging apparatus in first image capturing, and issue a notification of motion blur based on the estimated motion blur. This enables the operator to confirm motion blur caused by the movement of an imaging apparatus such as camera shake at the time of acquisition of a first captured image. After confirmation, the operator is allowed to change an image capturing parameter in such a way as to be able to acquire a captured image having a motion blur (including a captured image having no motion blur).

Furthermore, while, in the second exemplary embodiment, an example of calculating the amount of movement on an image by calculating the amount of movement on an imaging plane based on an angle made by movement at a time interval between images in preparatory image capturing and the focal length and dividing the calculated amount of movement on the imaging plane by a pixel pitch has been described, the method of calculating the amount of movement on an image is not limited to this. The method of calculating the amount of movement on an image can include calculating the amount of movement on an imaging plane based on an angle made by movement for an exposure period of an image in preparatory image capturing and the focal length and dividing the calculated amount of movement on the imaging plane by a pixel pitch. Specifically, the angular velocity detection unit 111 detects an angular velocity for an exposure period of an image in preparatory image capturing, and the motion blur notification image generation unit 800 generates a motion blur notification image based on the detected angular velocity. Furthermore, in this case, the estimated motion blur calculation unit 302 estimates motion vectors for every pixel as motion blur in main image capturing based on an exposure time in main image capturing and an exposure time of an image in preparatory image capturing.

A third exemplary embodiment described below is directed to solving such an issue that, in a case where the resolution (the number of pixels) of a motion blur notification plane is low (small), it is difficult for the operator to visually confirm motion blur of a small region such as the limbs. Therefore, the third exemplary embodiment is configured to obtain motion blur estimated based on motion vectors for every region of an object in first image capturing, divide each region from which to obtain motion vectors into a plurality of block regions, obtain a motion edge intensity for every block region, and issue a notification of motion blur based on the estimated motion blur and the obtained motion edge intensity. Furthermore, elements assigned with the respective same reference characters as those in the first and second exemplary embodiments are assumed to perform similar actions and processing operations to those in the first and second exemplary embodiments, and are, therefore, omitted from description here.

Figure 10:
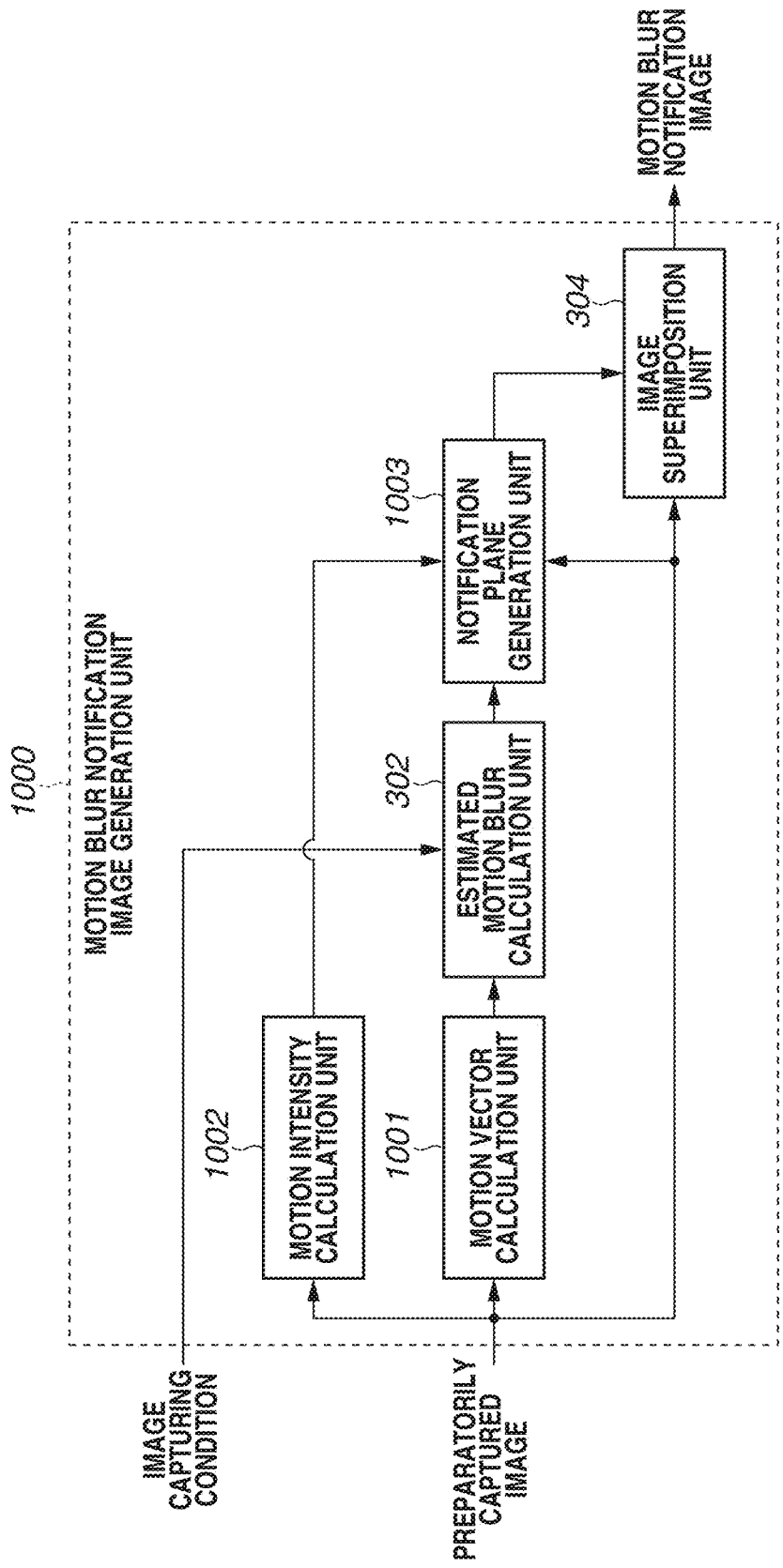
FIG. 10 is a diagram illustrating a configuration example of a motion blur notification image generation unit in a third exemplary embodiment.

FIG. 10 is a diagram illustrating a configuration example of a motion blur notification image generation unit 1000 included in the image processing unit 107. The motion blur notification image generation unit 1000 includes a motion vector calculation unit 1001, a motion intensity calculation unit 1002, an estimated motion blur calculation unit 302, a notification plane generation unit 1003, and an image superimposition unit 304. Furthermore, actions and processing operations of the estimated motion blur calculation unit 302 and the image superimposition unit 304 are similar to those in the first exemplary embodiment, and are, therefore, omitted from description here.

Figure 11:
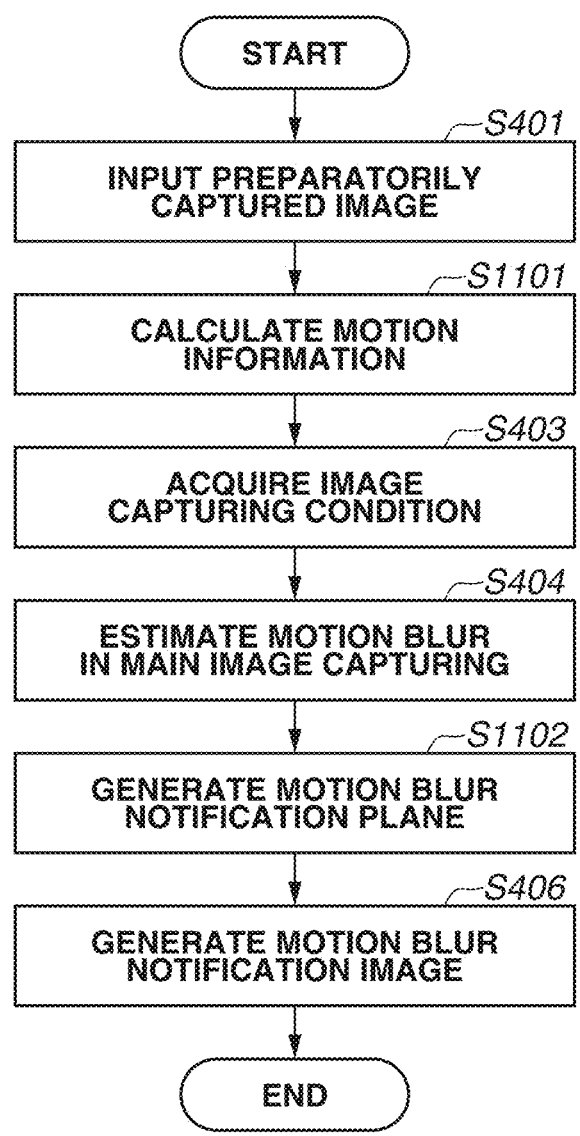
FIG. 11 is a flowchart illustrating a processing flow for generating a motion blur notification image in the third exemplary embodiment.

Next, processing which the motion blur notification image generation unit 1000 performs to generate a motion blur notification image is described in detail with reference to the flowchart of FIG. 11. Steps in the flowchart of FIG. 11 are performed by the control unit 101 or performed by the applicable units of the digital camera 100, including the motion blur notification image generation unit 1000, in response to instructions from the control unit 101.

In step S1101, the motion vector calculation unit 1001 calculates motion vectors between images of preparatory image capturing as motion information of an object by performing comparison processing between images for every unit region. While the minimum unit of a unit region may be set to be one pixel, in the third exemplary embodiment, to reduce a processing load to be applied to motion vector calculation, a plurality of pixels is set as a unit region during a normal operation. The unit region can be designated as an operation for determining the detection accuracy or processing speed of motion blur by an operation of the operator performed via the instruction input unit 110. For example, in a case where the detection accuracy of motion blur is set to high accuracy, the unit area becomes smaller than in a case where the detection accuracy of motion blur is set to low accuracy.

Moreover, in step S1101, the motion intensity calculation unit 1002 calculates a motion intensity by performing comparison processing between captured images for every block area, which is obtained by further dividing each unit region used for calculating motion vectors into a plurality of block regions. The minimum unit of a block region is also set to be a pixel, and, in the third exemplary embodiment, the motion intensity calculation unit 1002 is assumed to calculate a motion intensity for every pixel. In the first exemplary embodiment, an example in which the motion vector calculation unit 301 calculates motion vectors for every pixel as motion information has been described. On the other hand, in the third exemplary embodiment, an example in which the motion vector calculation unit 1001 calculates motion vectors for every unit region as motion information and the motion intensity calculation unit 1002 calculates a motion intensity for every pixel is described.

First, the motion vector calculation unit 1001 is described in detail with reference to FIG. 12.

Figure 12:
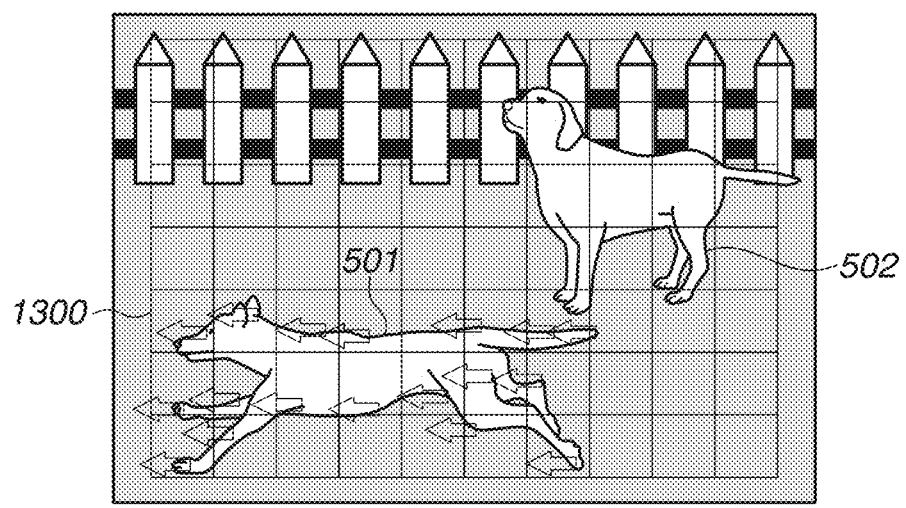
FIG. 12 is a diagram illustrating motion vectors in the third exemplary embodiment.

FIG. 12 is a diagram illustrating, in the preparatorily captured image illustrated in FIG. 5A, motion vectors, which the motion vector calculation unit 1001 calculates, and unit regions, from which to calculate motion vectors. In FIG. 12, each arrow indicates a motion vector, and each region surrounded by a rectangular solid line indicates a unit region. In the example illustrated in FIG. 12, with regard to a dog 501 which is running, motion vectors with sizes of a predetermined value or more are detected as leftward motion vectors, and, with regard to another dog 502 which stands still and a background fence, the values of motion vectors are zero or smaller than the predetermined value.

The motion vector calculation unit 1001 calculates one motion vector for every unit region 1300, from which to calculate a motion vector, and allocates the same motion vector as the calculated one motion vector to all of the pixels included in the unit region. According to such motion vector calculation processing being performed, for example, in a unit region from which a motion vector indicating leftward movement has been calculated as a unit region 1300, both the face of a dog which is running and the ground, which remains still, are made to have motion vectors indicating leftward movement.

In this way, calculating one motion vector for every unit region and allocating the same motion vector as the calculated one motion vector to all of the pixels included in the unit region enables more reducing the amount of processing than calculating motion vectors for all of the pixels as in the first exemplary embodiment.

With regard to a specific motion vector calculation method, similar actions and processing operations to those in the first exemplary embodiment are performed, and are, therefore, omitted from description here.

Next, the motion intensity calculation unit 1002 is described in detail with reference to FIGS. 13A, 13B, and 13C.

Figure 13A:
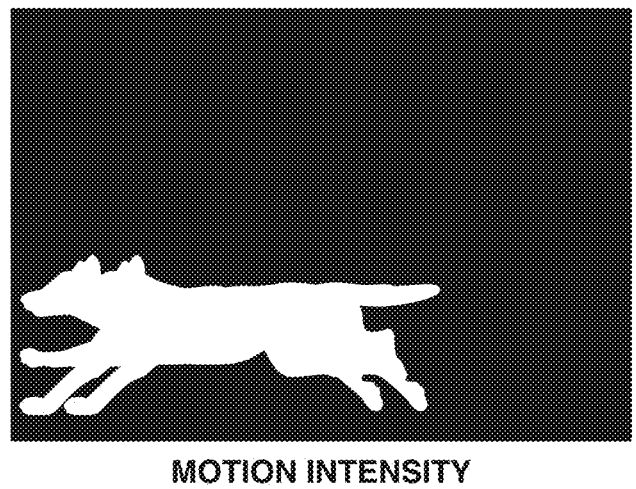
FIGS. 13A, 13B, and 13C are diagrams illustrating a motion intensity, an edge intensity, a motion edge intensity, respectively, in the third exemplary embodiment.
Figure 13B:
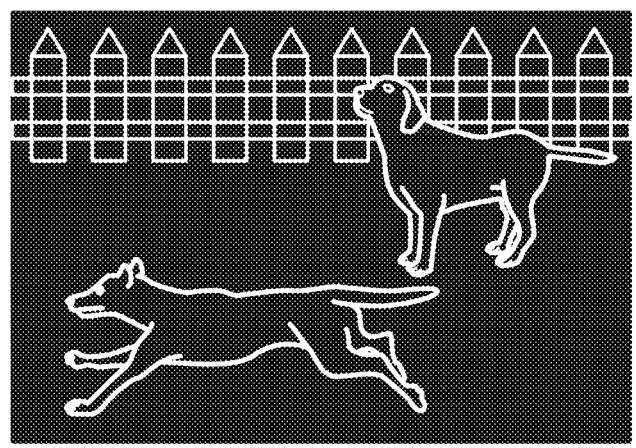
Figure 13C:
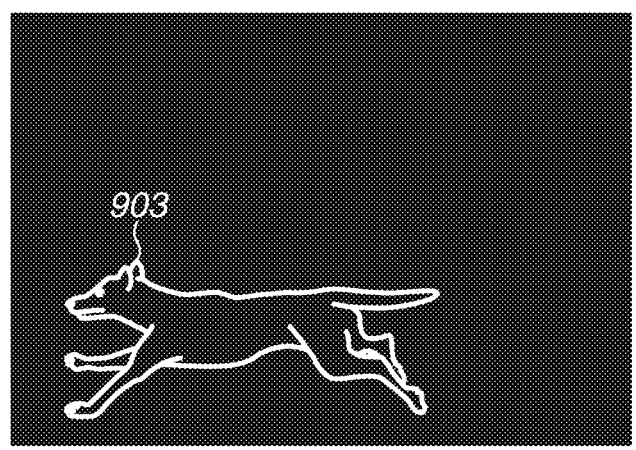

FIG. 13A is a diagram illustrating a motion intensity which the motion intensity calculation unit 1002 calculates in the preparatorily captured image illustrated in FIG. 5A. The motion intensity calculation unit 1002 calculates, as a motion intensity, a difference in pixel value at the same coordinates between images of preparatory image capturing. In the example illustrated in FIG. 13A, with regard to a dog 501 which is running in the preparatorily captured image illustrated in FIG. 5A, since a difference in pixel value between images is large, a large motion intensity is obtained. On the other hand, with regard to a dog 502 which stands still, other than the dog which is running, and a background fence, since a difference in pixel value between images is small, a small motion intensity is obtained. In this way, processing for calculating a motion intensity for every pixel based on a difference in pixel value between images enables detecting a motion region with a smaller amount of processing than processing for calculating a motion vector for every pixel.

Furthermore, while, in the third exemplary embodiment, an example in which the motion intensity calculation unit 1002 calculates a motion intensity for every pixel is described, the unit of calculation of a motion vector is not limited to this, but to a region smaller than the unit region from which to calculate a motion vector.

In step S1102, the notification plane generation unit 1003 generates an image plane used for issuing a notification of motion blur based on motion blur for every pixel calculated in step S404. For example, the notification plane generation unit 1003 generates an image plane used for issuing a notification of motion blur in such a discriminable manner as to emphasize displaying of pixels corresponding to motion blur with a predetermined amount of blur or more.

Here, the method of generating a notification plane used for issuing a notification of motion blur of an object, which is generated by the notification plane generation unit 1003, is described in detail with reference to FIGS. 13B and 13C. FIG. 13B is a diagram illustrating an edge intensity in the preparatorily captured image illustrated in FIG. 5A, and FIG. 13C is a diagram illustrating a motion edge intensity therein. In the third exemplary embodiment, an example of issuing a notification of motion blur by displaying, in an emphasized manner, the edge of an object on which motion blur has occurred as illustrated in FIG. 7C is described.

The notification plane generation unit 1003 detects an edge intensity of the preparatorily captured image. The edge intensity detected by the notification plane generation unit 1003 is illustrated in FIG. 13B. A specific detection method for an edge intensity is similar to that in the first exemplary embodiment, and is, therefore, omitted from description here. Then, the notification plane generation unit 1003 calculates a motion edge intensity by multiplying a motion intensity and an edge intensity at the same coordinates by each other for every pixel. The motion edge intensity calculated by the notification plane generation unit 1003 is illustrated in FIG. 13C. The motion edge intensity takes a larger value for a pixel the edge intensity of which is larger and the motion intensity of which is larger. Then, the notification plane generation unit 1003 extracts pixels the motion edge intensity of which is a predetermined value or more and the estimated motion blur of which is a predetermined value or more. With respect to the extracted pixels, the notification plane generation unit 1003 generates such a motion blur notification plane as to display, in an emphasized manner, the edge of an object on which motion blur is occurring, such as a motion blur notification edge 903 illustrated in FIG. 7C, and then generates a motion blur notification image such as that illustrated in FIG. 7C by superimposing the motion blur notification plane on the preparatorily captured image. In this way, generating a motion blur notification plane using a motion edge intensity enables displaying, in an emphasized manner, only the edge of a dog which is running even if the same leftward motion vector is allocated to the dog which is running and the ground which remains still as in the unit region 1300.

Furthermore, while, in the third exemplary embodiment, an example of calculating a motion edge intensity by multiplying a motion intensity and an edge intensity at the same coordinates by each other for every pixel has been described, the calculation method for a motion edge intensity is not limited to this. For example, the calculation method can include calculating a motion edge intensity by adding together a motion intensity and an edge intensity at the same coordinates for every pixel.

Furthermore, in a case where the unit region from which the motion vector calculation unit 1001 calculates a motion vector is sufficiently small, a notification of motion blur can be issued according to motion information about only motion vectors as in the first exemplary embodiment. This is because, in a case where the unit region from which to calculate a motion vector is sufficiently small, the operator is able to visually confirm motion blur in a small region such as limbs.

The above-described third exemplary embodiment is configured to calculate a motion edge intensity by multiplying the detected edge intensity and the motion intensity at the same coordinates by each other for every pixel. However, in such an image capturing scene that motion blur occurs, the edge intensity on a preparatorily captured image may in some cases decrease, so that a notification of motion blur may not be able to be appropriately issued.

Figure 14:
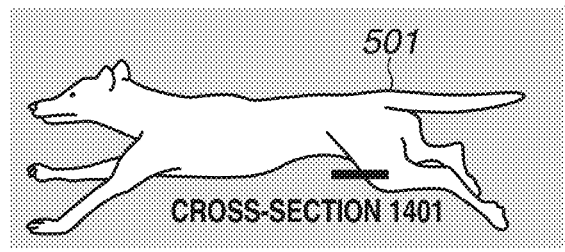
FIG. 14 is a diagram illustrating an object and the position of a cross-section of the object in a preparatorily captured image in a fourth exemplary embodiment.

A specific example of the above-mentioned issue is described with reference to FIG. 14 and FIGS. 15A and 15B. FIG. 14 illustrates an image of the dog 501 in the preparatorily captured image illustrated in FIGS. 5A and 5B, and FIGS. 15A and 15B illustrate transitions of the edge intensity in a cross-section 1401 illustrated in FIG. 14.

Figure 15A:
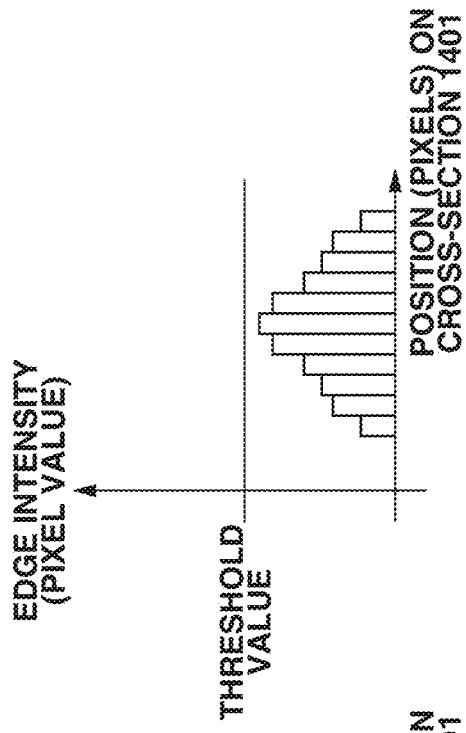
FIGS. 15A and 15B are diagrams each illustrating a relationship between positional coordinates and edge intensities on a preparatorily captured image in the fourth exemplary embodiment.
Figure 15B:
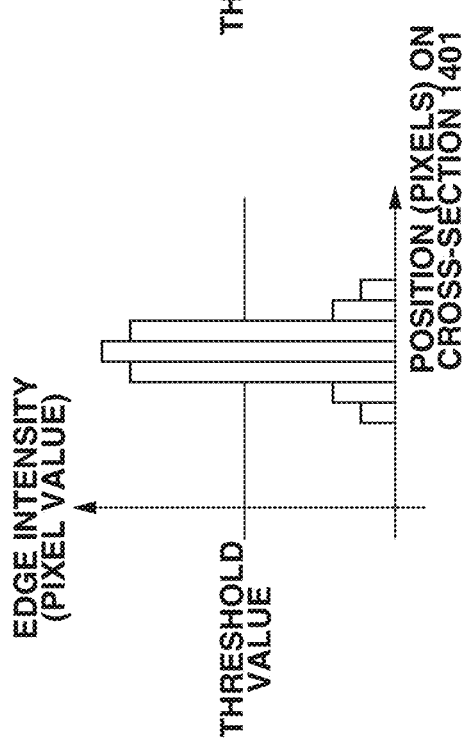

In FIGS. 15A and 15B, the horizontal axis represents positional coordinates in horizontal direction on the cross-section 1401, and the vertical axis represents the detected edge intensity.

In a case where blur is not occurring on the preparatorily captured image, such an edge intensity as illustrated in FIG. 15A is detected on the cross-section 1401.

However, in a case where blur is occurring on the preparatorily captured image, the edge intensity detected on the cross-section 1401 decreases as illustrated in FIG. 15B.

In consideration of the above-mentioned issue, a fourth exemplary embodiment described below is configured to set an edge intensity threshold value used for discriminating the above-mentioned edge region according to motion vectors of an object, correct an edge intensity based on a result of discrimination, and issue a notification of motion blur.

The fourth exemplary embodiment is described with reference to FIG. 16, FIG. 17, and FIG. 18.

Furthermore, elements assigned with the respective same reference characters as those in the third exemplary embodiment are assumed to perform similar actions and processing operations to those in the third exemplary embodiment, and are, therefore, omitted from description here.

Furthermore, since there is no difference in elements other than a motion blur notification image generation unit in the third exemplary embodiment and a second motion blur notification image generation unit in the fourth exemplary embodiment, the other elements are omitted from description here.

Figure 16:
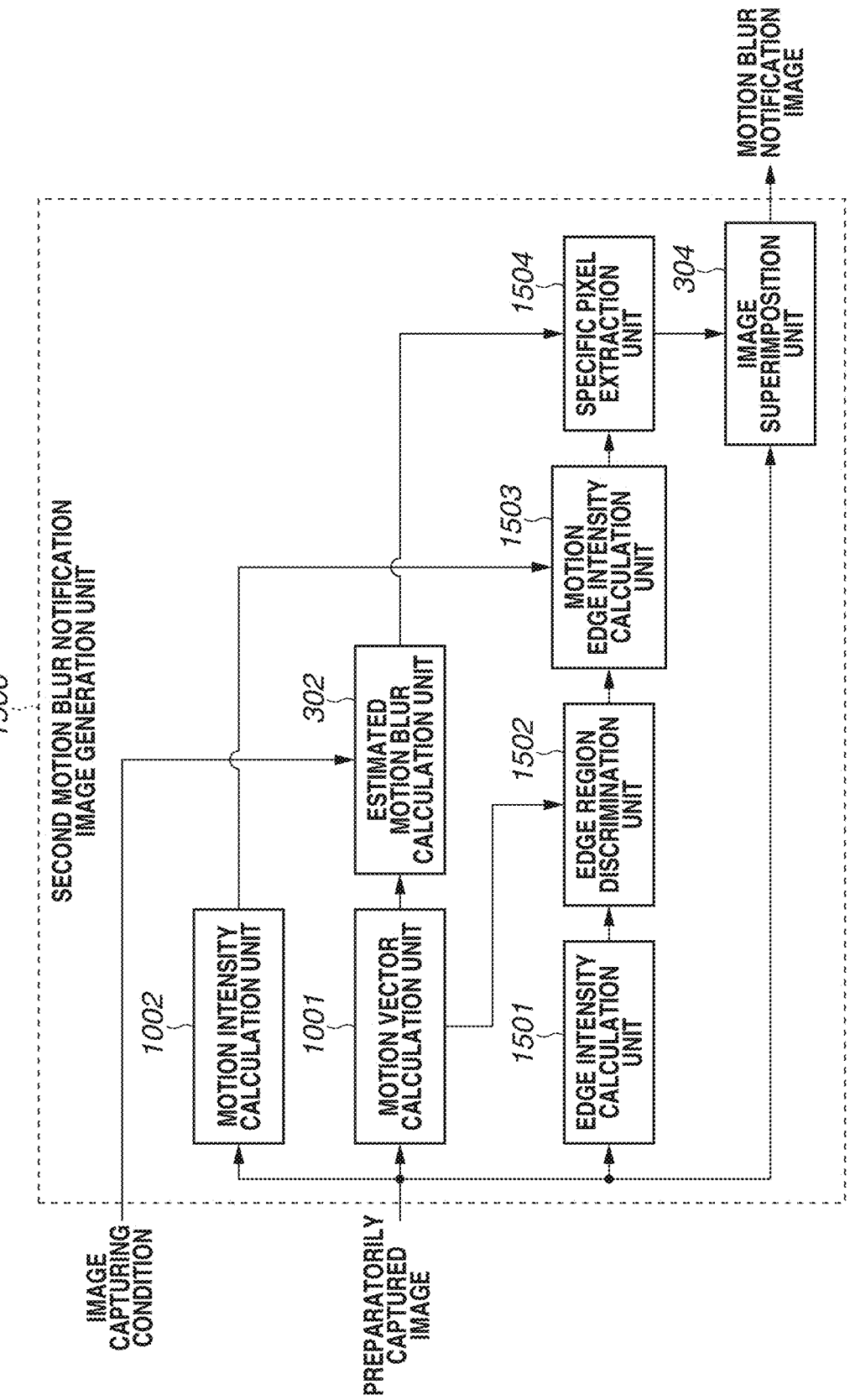
FIG. 16 is a diagram illustrating a configuration example of a motion blur notification image generation unit in the fourth exemplary embodiment.

First, FIG. 16 is a diagram illustrating a configuration example of a second motion blur notification image generation unit 1500 included in the image processing unit 107.

The second motion blur notification image generation unit 1500 includes a motion vector calculation unit 1001, a motion intensity calculation unit 1002, an estimated motion blur calculation unit 302, an image superimposition unit 304, an edge intensity calculation unit 1501, an edge region discrimination unit 1502, a motion edge intensity calculation unit 1503, and a specific pixel extraction unit 1504.

Actions and processing operations of the motion vector calculation unit 1001, the motion intensity calculation unit 1002, the estimated motion blur calculation unit 302, and the image superimposition unit 304 are similar to those in the first exemplary embodiment and the third exemplary embodiment, and are, therefore, omitted from description here.

The edge intensity calculation unit 1501 acquires a preparatorily captured image and calculates an edge intensity of the acquired preparatorily captured image. A specific calculation method for an edge intensity is similar to that in the first exemplary embodiment, and is, therefore, omitted from description here.

The edge region discrimination unit 1502 sets an edge intensity threshold value used for discriminating the above-mentioned edge region, uses the edge intensity threshold value to determine whether the edge intensity is greater than or equal to the edge intensity threshold value, and, if the edge intensity is greater than or equal to the edge intensity threshold value, corrects the edge intensity. The detailed operation of the edge region discrimination unit 1502 is described below.

The motion edge intensity calculation unit 1503 calculates a motion edge intensity by multiplying the edge intensity and the motion intensity by each other or adding together them. A specific calculation method for a motion edge intensity is similar to that in the third exemplary embodiment, and is, therefore, omitted from description here.

The specific pixel extraction unit 1504 extracts pixels the motion edge intensity of which is a predetermined value or more and the estimated motion blur of which is a predetermined value or more. A specific extraction method is similar to that in the third exemplary embodiment, and is, therefore, omitted from description here.

Next, processing which the edge region discrimination unit 1502 performs to discriminate an edge region with an edge intensity threshold value with respect to the detected edge intensity and correct the edge region is described in detail with reference to the flowchart of FIG. 17.

Figure 17:
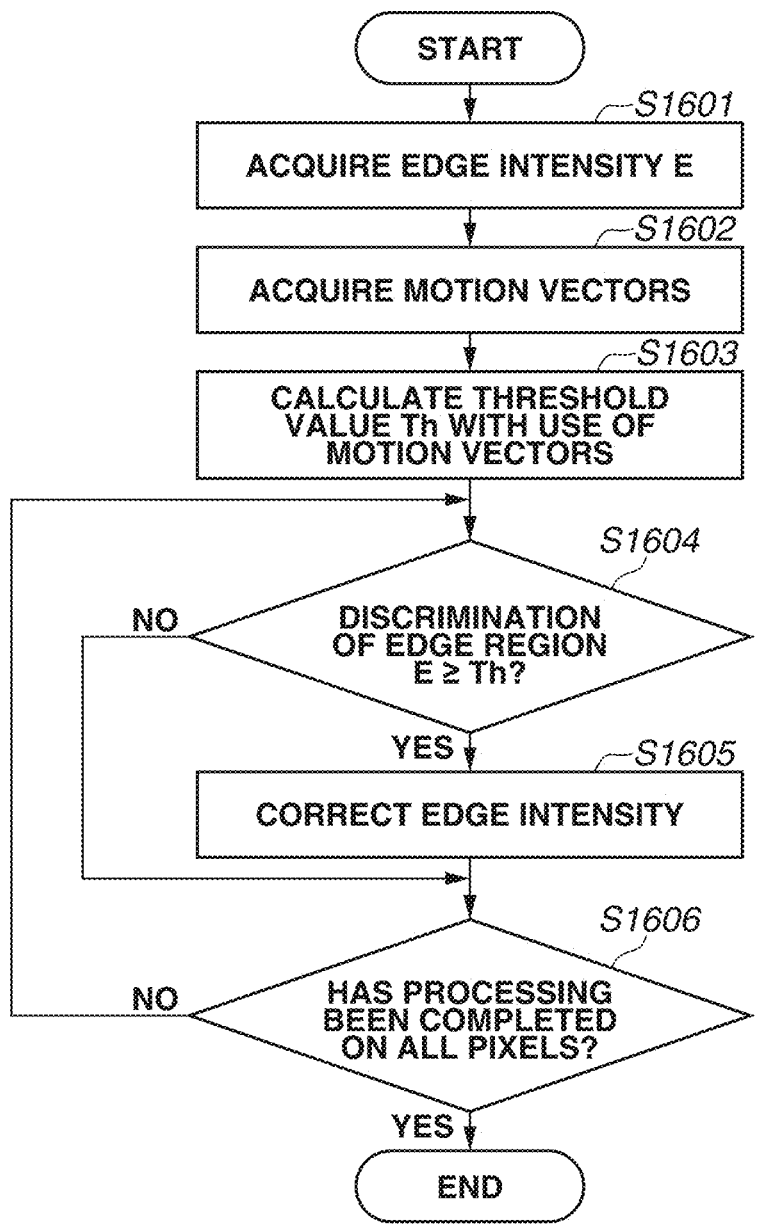
FIG. 17 is a flowchart illustrating a processing flow for second notification plane generation in the fourth exemplary embodiment.

Steps in the flowchart of FIG. 17 are performed by the control unit 101 or performed by the applicable units of the digital camera 100, including the edge region discrimination unit 1502, in response to instructions from the control unit 101.

In the fourth exemplary embodiment, an example of calculating an edge intensity threshold value based on the maximum value in magnitude of motion vectors is described.

In step S1601, the edge region discrimination unit 1502 acquires edge intensities calculated by the edge intensity calculation unit 1501, thus obtaining such a transition of edge intensities as illustrated in FIG. 15B based on the cross-section 1401 illustrated in FIG. 14.

In step S1602, the edge region discrimination unit 1502 acquires a motion vector for every unit region calculated by the motion vector calculation unit 1001 based on the cross-section 1401 illustrated in FIG. 14.

In step S1603, the edge region discrimination unit 1502 calculates an edge intensity threshold value Th from the acquired motion vector for every unit region.

First, the edge region discrimination unit 1502 calculates the maximum value in magnitude of motion vectors from the acquired motion vector for every unit region.

Furthermore, while, in the fourth exemplary embodiment, the maximum value in magnitude of the motion vector acquired for every unit region is calculated, the value to be calculated is not limited to this and may be a statistic value of the motion vector or of the magnitude of the motion vector.

For example, in the case of issuing an appropriate notification of motion blur with respect to an object the proportion of which to the whole preparatorily captured image is large, a mode value of the motion vector for every unit region can be used.

Next, the edge region discrimination unit 1502 calculates an edge intensity threshold value Th used for discriminating an edge region, based on the calculated maximum value of the motion vector.

The edge intensity threshold value Th is calculated by the following formula (5) according to a linear functional relationship.

$$Th = A \cdot v + Th_0 \quad (5)$$

Th: edge intensity threshold value
A: minus constant
v: maximum value of motion vector
$Th_0$: reference edge intensity threshold value Here, the minus constant A in formula (5) is a coefficient representing a proportional constant determined by the degree of relationship between a motion vector and a decrease in edge intensity. In the fourth exemplary embodiment, the minus constant A is assumed to be previously stored in the ROM 102.

Furthermore, while, in the fourth exemplary embodiment, an example of calculating an edge intensity threshold value has been described with use of a linear function, the calculation method for an edge intensity threshold value is not limited to this. The calculation method is to be able to approximate the degree of relationship between motion blur and a decrease in edge intensity. For example, the calculation method can include calculating an edge intensity threshold value according to a quadratic function.

In step S1604, the edge region discrimination unit 1502 discriminates an edge region based on the edge intensity threshold value calculated in step S1603. The edge region discrimination unit 1502 performs such discrimination by determining whether the edge intensity acquired in step S1601 is greater than or equal to the edge intensity threshold value calculated in step S1603. If it is determined that the edge intensity is greater than or equal to the edge intensity threshold value (YES in step S1604), the edge region discrimination unit 1502 performs step S1605 and then performs step S1606.

If it is determined that the edge intensity is less than the edge intensity threshold value (NO in step S1604), the edge region discrimination unit 1502 advances the processing to step S1606.

Discrimination of an edge region in step S1604 is described with reference to FIG. 18.

Figure 18:
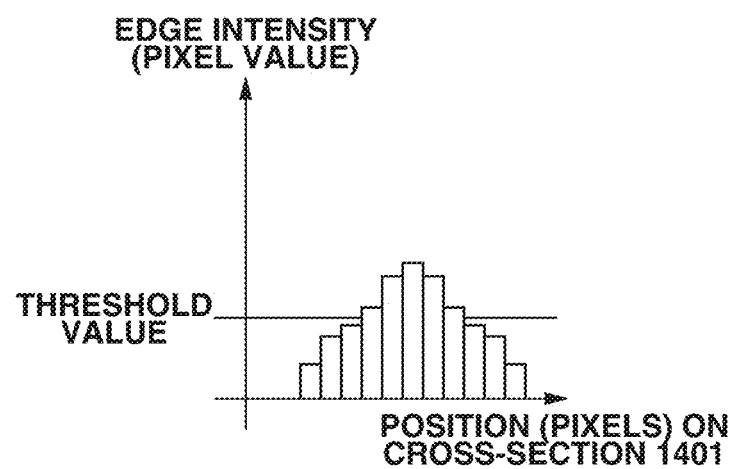
FIG. 18 is a diagram illustrating a relationship between a changed edge intensity threshold value and edge intensities in the fourth exemplary embodiment.

FIG. 18 is a diagram illustrating a case where the discrimination of an edge region is applied to the edge intensity illustrated in FIG. 15B according to the fourth exemplary embodiment. As with FIGS. 15A and 15B, in FIG. 18, the vertical axis represents the detected edge intensity, and the horizontal axis represents positional coordinates on the preparatorily captured image in the cross-section 1401 illustrated in FIG. 14. Even in a case where the edge intensity has decreased due to motion blur such as that illustrated in FIG. 15B occurring, an edge region is discriminated.

Next, in step S1605, the edge region discrimination unit 1502 performs correction processing on the edge intensity which has been determined to be greater than or equal to the edge intensity threshold value.

The edge intensity is corrected according to the following formula (6).

$$E' = E \times \frac{Th_0}{Th} \quad (6)$$

E': edge intensity subjected to correction
E: edge intensity not yet subjected to correction
$Th_0$: reference edge intensity threshold value
Th: threshold value calculated in step S1603

Figure 19:
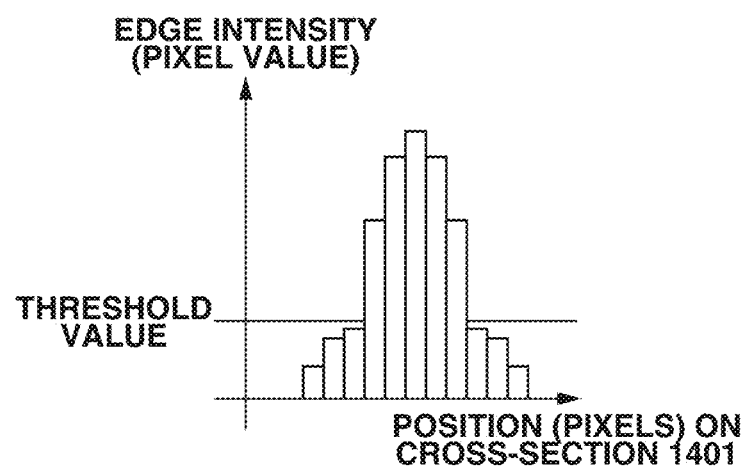
FIG. 19 is a diagram illustrating corrected edge intensities in the fourth exemplary embodiment.

FIG. 19 illustrates a result obtained by performing the correction expressed by formula (6) on the case illustrated in FIG. 18. Only edge intensities which have exceeded the edge intensity threshold value are corrected to become intensities equivalent to the edge intensities which are obtained in a case where motion blur is not occurring, according to a ratio between edge intensity threshold values indicated in formula (6).

Furthermore, while, in the fourth exemplary embodiment, correction is performed according to a ratio between edge intensity threshold values, the correction formula is not limited to this.

For example, in a where almost all of the edge intensities not yet subjected to correction are approximately equal to each other, a difference between the edge intensity threshold values can be added to the edge intensities.

Next, in step S1606, the edge region discrimination unit 1502 determines whether the discrimination of an edge region and the correction of an edge intensity have been completed on all of the pixels. If it is determined that such processing operations have not yet been completed (NO in step S1606), the edge region discrimination unit 1502 returns the processing to step S1604, and, if it is determined that such processing operations have been completed (YES in step S1606), the edge region discrimination unit 1502 ends the processing.

In this way, setting an edge intensity threshold value used for discriminating an edge region according to motion blur occurring on a preparatorily captured image and correcting an edge intensity based on a result of discrimination enables issuing a notification of motion blur even with respect to an object the edge intensity of which decreases due to motion blur.

Furthermore, while, in the fourth exemplary embodiment, the edge intensity threshold value is determined based on the magnitude of a motion vector, for example, in a case where an object moves only in one direction as in the case of panning image capturing, the edge intensity threshold value can be determined based on at least direction components of motion vectors of the object.

Moreover, in the fourth exemplary embodiment, one edge intensity threshold value is determined from a motion vector for every unit region. However, in a case where a plurality of objects which performs respective different motions is present in a preparatorily captured image, motion vectors calculated in the respective unit regions can be used to determine edge intensity threshold values for the respective unit regions.

The aspect of the embodiments can also be attained by performing the following process. Specifically, the process supplies a storage medium on which program code of software with procedures for implementing the functions of the above-described exemplary embodiments described therein has been recorded to a system or apparatus. Then, the process causes a computer (or a CPU or a micro processing unit (MPU)) of the system or apparatus to read out and execute the program code stored in the storage medium.

In this case, the program code itself read out from the storage medium implements novel functions of the aspect of the embodiments, and a storage medium and a program with the program code stored therein can constitute the aspect of the embodiments.

Moreover, the storage medium used to supply the program code includes, for example, a flexible disk, a hard disk, an optical disk, and a magneto-optical disk. Moreover, storage medium used to supply the program code further includes, for example, a compact disc read-only memory (CD-ROM), a compact disc recordable (CD-R), a compact disc rewritable (CD-RW), a digital versatile disc read-only memory (DVD-ROM), a digital versatile disc random access memory (DVD-RAM), a digital versatile disc rewritable (DVD-RW), a digital versatile disc recordable (DVD-R), a magnetic tape, a non-volatile memory card, and a read-only memory (ROM).

Moreover, making the program code read out by the computer executable implements the functions of the above-described exemplary embodiments. Additionally, for example, an operating system (OS) running on the computer can also perform a part or the whole of the actual processing based on an instruction from the program code so as to implement the functions of the above-described exemplary embodiments.

Furthermore, the following process can be included. First, the process writes the program code read out from the storage medium into a memory included in a function expansion board inserted into the computer or a function expansion unit connected to the computer. After that, for example, a CPU included in the function expansion board or function expansion unit performs a part or the whole of the actual processing based on an instruction from the program code.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-247850 filed Dec. 28, 2018, and No. 2019-214499 filed Nov. 27, 2019, which are hereby incorporated by reference herein in their entireties.

What is claimed is:

1. An apparatus comprising:
one or more processors; and
a memory storing instructions which, when executed by the one or more processors, cause the apparatus to function as:
an acquisition unit configured to acquire first captured images obtained by the first image capturing with a first image capturing parameter in an image sensor and motion information about an object in the first captured images;

a setting unit configured to set a second image capturing parameter;

an estimation unit configured to estimate motion blur of an object based on the motion information and the second image capturing parameter;

a notification unit configured to issue a notification of the motion blur; and an instruction unit configured to issue an image capturing instruction while a first captured image obtained by the first image capturing with the first image capturing parameter in the image sensor is sequentially output, wherein the image sensor outputs the second captured image obtained by second image capturing with the second image capturing parameter in response to the image capturing instruction, wherein the acquisition unit calculates a motion vector in each of a plurality of regions, and a difference between the first captured images for each of the block regions, and wherein the notification unit issues the notification of the motion blur prior to receiving the image capturing instruction.

2. The apparatus according to claim 1, wherein the estimation unit estimates the motion blur based on the motion information, the first image capturing parameter, and the second image capturing parameter.

3. The apparatus according to claim 1, wherein the acquisition unit calculates and acquires the motion information by making a comparison in image between the first captured images.

4. The apparatus according to claim 1, wherein the notification unit issues a notification of the motion blur by displaying information corresponding to the motion blur on a display unit.

5. The apparatus according to claim 1, wherein the notification unit issues a notification of the motion blur by superimposing information corresponding to the motion blur on the first captured image and displaying the first captured image with the information superimposed thereon on a display unit.

6. The apparatus according to claim 1,
wherein the acquisition unit acquires motion information corresponding to a plurality of regions of the first captured images;
wherein the estimation unit estimates motion blur in a plurality of regions of the second captured image from the motion information corresponding to the plurality of regions of the first captured images, and
wherein the notification unit issues a notification of the motion blur for each of a plurality of corresponding regions.

7. The apparatus according to claim 6, wherein the notification unit issues a notification of the motion blur by displaying, in each of the first captured images, a frame for every region in which motion blur in the second captured image has been estimated to have a predetermined amount of blur or more.

8. The apparatus according to claim 6, wherein the notification unit issues a notification of the motion blur by displaying, in each of the first captured images, an edge region in a discriminable manner for every region in which motion blur in the second captured image has been estimated to have a predetermined amount of blur or more.

9. The apparatus according to claim 1,
wherein the first image capturing is performed before the second image capturing, and
wherein the notification unit issues a notification of the motion blur while the acquisition unit is sequentially acquiring the first captured images.

10. The apparatus according to claim 1,
wherein, when the second image capturing parameter is changed by the setting unit, the estimation unit performs re-estimation of the motion blur, and
wherein the notification unit issues a notification of the motion blur re-estimated by the estimation unit.

11. The apparatus according to claim 1, wherein the setting unit sets the second image capturing parameter based on the first captured images.

12. An apparatus comprising:
one or more processors; and
a memory storing instructions which, when executed by the one or more processors, cause the apparatus to function as:
an acquisition unit configured to acquire first captured images obtained by first image capturing with a first image capturing parameter in an image sensor and motion information about an object in the first captured images;
a setting unit configured to set a second image capturing parameter;
an estimation unit configured to estimate motion blur of an object based on the motion information and the second image capturing parameter; and
a notification unit configured to issue a notification of the motion blur,
wherein the acquisition unit calculates, for each of the first captured images obtained by a plurality of times of the first image capturing, a motion vector in each of a plurality of regions, segments each of the plurality of regions into a plurality of block regions, and calculates a difference between the first captured images for each of the block regions, and
wherein the estimation unit estimates motion blur of the object for each of the block regions from the motion vector and the difference.

13. The apparatus according to claim 12, wherein the notification unit issues a notification of the motion blur by displaying, in each of the first captured images, an edge region in a discriminable manner for every region in which motion blur in the second captured image has been estimated to have a predetermined amount of blur or more.

14. The apparatus according to claim 13, wherein the notification unit switches a threshold value used for determining the edge region according to the motion information.

15. The apparatus according to claim 14, wherein the notification unit changes the threshold value used for determining the edge region based on a statistical value calculated from the motion vector.

16. The apparatus according to claim 15, wherein the statistical value is calculated from at least a maximum value of magnitude of the motion vector.

17. The apparatus according to claim 15, wherein the statistical value is calculated from at least a mode value of magnitude of the motion vector.

18. The apparatus according to claim 15, wherein the notification unit changes the threshold value used for determining the edge region based on at least one direction component of the motion vector.

19. The apparatus according to claim 15, wherein the notification unit changes the threshold value used for determining the edge region in each of a plurality of regions for each of the first captured images.

20. The apparatus according to claim 12, wherein, in a case where a size of each of the plurality of regions in which the motion vector is calculated is a threshold value or more, the estimation unit estimates motion blur of the object for each of the block regions from the motion vector and the difference, and, in a case where the size of each of the plurality of regions in which the motion vector is calculated is smaller than the threshold value, the estimation unit estimates motion blur of the object for each of the plurality of regions from the motion vector.

21. An apparatus which includes an image sensor and which, in a case where an image capturing instruction is issued by an operator while first captured images obtained by first image capturing with a first image capturing parameter in the image sensor is sequentially output, outputs a second captured image obtained by second image capturing with a second image capturing parameter in the image sensor in response to the image capturing instruction, the apparatus comprising:
one or more processors; and
a memory storing instructions which, when executed by the one or more processors, cause the imaging apparatus to function as:
a calculation unit configured to calculate motion information based on the first captured images output from the imaging unit;
a setting unit configured to set the second image capturing parameter;
an estimation unit configured to calculate motion blur based on the motion information and the second image capturing parameter;
a notification unit configured to issue a notification of the estimated motion blur prior to receiving the image capturing instruction; and
an instruction unit configured to issue the image capturing instruction,
wherein the calculation unit calculates a motion vector in each of a plurality of regions, and a difference between the first captured images for each of the block regions.

22. An information processing method comprising:
acquiring first captured images obtained by first image capturing with a first image capturing parameter in an image sensor and motion information about and object in the first captured images;
setting a second image capturing parameter independently of the first image capturing parameter;
estimating motion blur of an object based on the motion information and the second image capturing parameter;
issuing a notification of the motion blur,
issuing an imaging capturing instruction while the first captured image obtained by first image capturing with the first image capturing parameter in the image sensor is sequentially output;
calculating a motion vector in each of a plurality of regions and a difference between the first captured images for each of the block regions; and
outputting the second captured image obtained by second image capturing with the second image capturing parameter in response to the image capturing instruction,
wherein the issuing issues the notification of the motion blur prior to receiving the image capturing instruction.

23. A method for an apparatus which includes an imaging unit and which, in a case where an image capturing instruction is issued by an operator while first captured images obtained by first image capturing with a first image capturing parameter is sequentially output, outputs a second captured image obtained by second image capturing with a second image capturing parameter in response to the image capturing instruction, the method comprising:
calculating motion information based on the first captured images output from the imaging unit;
setting the second image capturing parameter;
estimating motion blur based on the motion information and the second image capturing parameter;
issuing a notification of the estimated motion blur prior to receiving the image capturing instruction;
calculating a motion vector in each of a plurality of regions and a difference between the first captured images for each of the block regions; and
issuing the image capturing instruction.

24. A non-transitory computer-readable storage medium storing computer-executable instructions that, when executed by a computer, cause the computer to perform a method comprising:
acquiring first captured images obtained by first image capturing with a first image capturing parameter in an image sensor and motion information about an object in the first captured images;
setting a second image capturing parameter;
estimating motion blur of an object based on the motion information and the second image capturing parameter;
issuing a notification of the motion blur;
issuing an image capturing instruction while the captured image obtained by first image capturing with the first image capturing parameter in the image sensor is sequentially output; and
outputting the second captured image obtained by second image capturing with the second image capturing parameter in response to the image capturing instruction;
calculating a motion vector in each of a plurality of regions and a difference between the first captured images for each of block regions,
wherein the issuing issues the notification of the motion blur prior to receiving the image capturing instruction.

* * * * *